(12) United States Patent
Chernyak

(10) Patent No.: US 11,077,566 B2
(45) Date of Patent: Aug. 3, 2021

(54) ROBOTIC LEG

(71) Applicant: Boston Dynamics, Inc., Waltham, MA (US)

(72) Inventor: Vadim Chernyak, Waltham, MA (US)

(73) Assignee: Boston Dynamics, Inc., Waltham, MA (US)

(*) Notice: Subject to any disclaimer, the term of this patent is extended or adjusted under 35 U.S.C. 154(b) by 143 days.

(21) Appl. No.: 16/299,580

(22) Filed: Mar. 12, 2019

(65) Prior Publication Data
US 2020/0290217 A1 Sep. 17, 2020

(51) Int. Cl.
B25J 17/00 (2006.01)
B25J 17/02 (2006.01)
B25J 18/00 (2006.01)
B25J 19/00 (2006.01)
B25J 5/00 (2006.01)
B25J 9/00 (2006.01)
B25J 9/10 (2006.01)
B25J 15/06 (2006.01)

(52) U.S. Cl.
CPC ............. *B25J 19/002* (2013.01); *B25J 5/007* (2013.01); *B25J 9/0015* (2013.01); *B25J 9/106* (2013.01); *B25J 15/065* (2013.01)

(58) Field of Classification Search
CPC ...... B25J 9/104; B25J 17/0241; B25J 9/0006; B25J 9/144; B25J 17/025
See application file for complete search history.

(56) References Cited

U.S. PATENT DOCUMENTS

| 5,159,988 | A  | * | 11/1992 | Gomi     | B25J 9/06    |
|           |    |   |         |          | 180/8.1      |
| 5,343,397 | A  | * | 8/1994  | Yoshino  | B62D 57/032  |
|           |    |   |         |          | 180/8.1      |
| 6,220,104 | B1 | * | 4/2001  | Yoshino  | B25J 13/085  |
|           |    |   |         |          | 73/862.08    |
| 7,492,115 | B2 | * | 2/2009  | Gomi     | B25J 9/1065  |
|           |    |   |         |          | 318/568.11   |
| 8,459,139 | B2 | * | 6/2013  | Lee      | B25J 9/1045  |
|           |    |   |         |          | 74/490.05    |
| 8,714,045 | B2 | * | 5/2014  | Kim      | B25J 9/104   |
|           |    |   |         |          | 74/490.04    |
| 9,486,919 | B1 | * | 11/2016 | Thorne   | B25J 9/144   |
| 9,895,240 | B2 | * | 2/2018  | Langlois | A61F 2/70    |
| 10,189,519| B2 | * | 1/2019  | Hurst    | B62D 57/032  |

(Continued)

Primary Examiner — Jake Cook
(74) Attorney, Agent, or Firm — Honigman LLP; Brett A. Krueger

(57) ABSTRACT

A robotic leg includes a hip, a first pulley attached to the hip and defining a first axis of rotation, a first leg portion having a first end portion and a second end portion, a second pulley rotatably coupled to the second end portion of the first leg portion and defining a second axis of rotation, a second leg portion having a first end portion and a second end portion, and a timing belt trained about the first pulley and the second pulley for synchronizing rotation of the first leg portion about the first axis of rotation and rotation of the second leg portion about the second axis of rotation. The first end portion of the first leg portion is rotatably coupled to the hip and configured to rotate about the first axis of rotation. The first end portion of the second leg portion is fixedly attached to the second pulley.

10 Claims, 13 Drawing Sheets

(56) References Cited

U.S. PATENT DOCUMENTS

2015/0283709 A1* 10/2015 Dalakian .................. B25J 9/046
                                                        74/490.04
2016/0158932 A1   6/2016 Wyrobek et al.
2018/0194000 A1*  7/2018 Smith ....................... A61F 2/70
2019/0232485 A1*  8/2019 Reese .................... B25J 9/0057

* cited by examiner

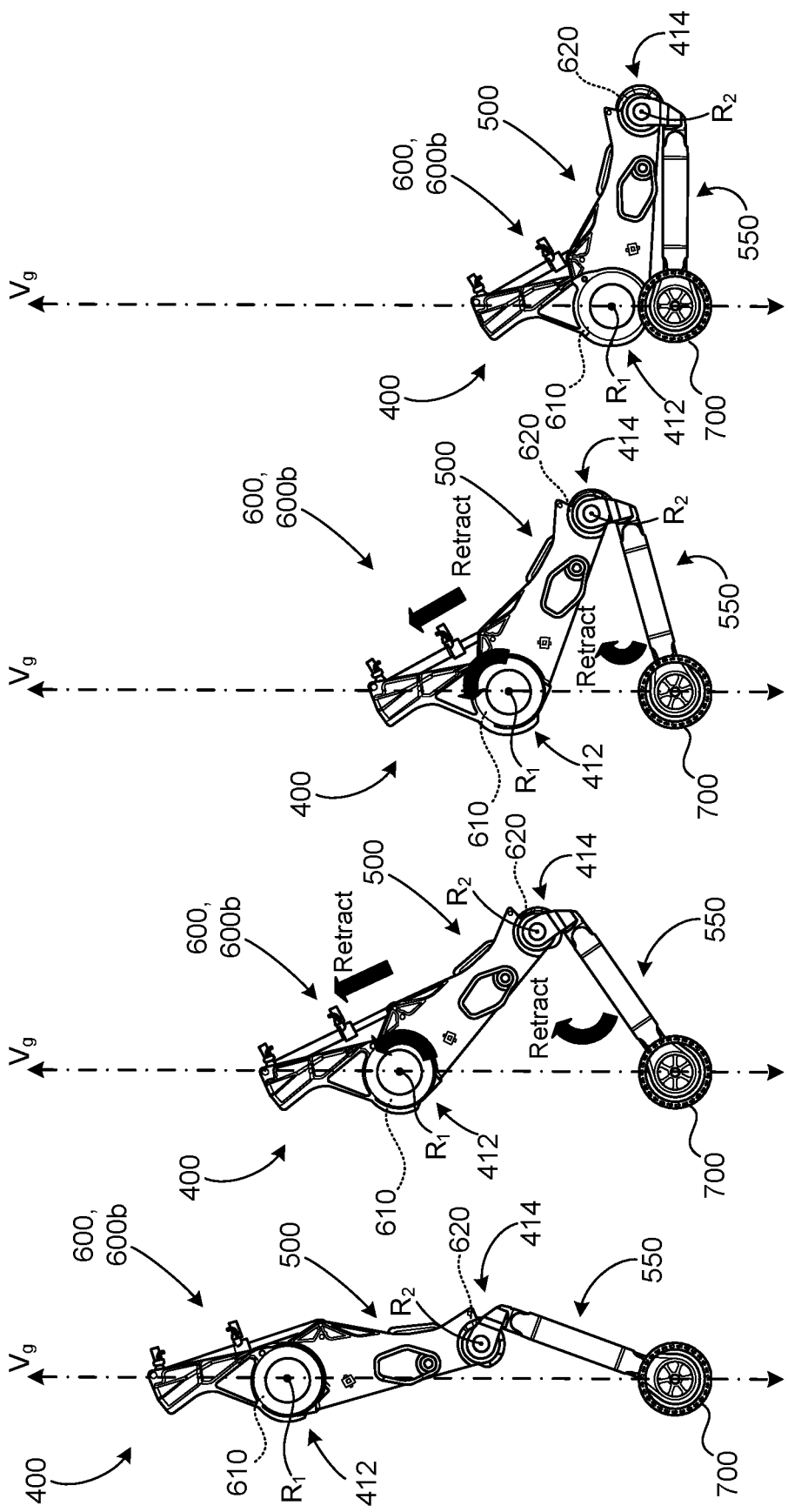

ROBOTIC LEG

TECHNICAL FIELD

This disclosure relates to a robotic leg.

BACKGROUND

Robots currently perform tasks in various working environments, such as factories, storage facilities, office buildings, and hospitals. Moreover, robots are sometimes designed with large stationary or moveable bases that allow the robot to maintain an upright position while performing tasks that involve lifting and handling heavy objects without tipping over. The bases, however, tend to be heavy, large, slow, and cumbersome, severely limiting mobility and being inappropriate for use in areas with tight footprints. While other robots with smaller and lighter bases or mobility platforms are more maneuverable than the robots with large bases, they are typically not practical for carrying heavy objects due to instabilities resulting from shifts in center of mass and changes in momentum as the objects are picked up and put down.

SUMMARY

One aspect of the disclosure provides a robotic leg that includes a hip, a first pulley fixedly attached to the hip and defining a first axis of rotation, a first leg portion having a first end portion and a second end portion, a second pulley rotatably coupled to the second end portion of the first leg portion, and a second leg portion having a first end portion and a second end portion. The first end portion of the first leg portion is rotatably coupled to the hip and configured to rotate about the first axis of rotation. The first pulley defines a first axis of rotation the second pulley defines a second axis of rotation, and the first end portion of the second leg portion is fixedly attached to the second pulley. The robotic leg also includes a timing belt trained about the first pulley and the second pulley for synchronizing rotation of the first leg portion about the first axis of rotation and rotation of the second pulley about the second axis of rotation. Rotation of the first leg portion about the first axis of rotation causes rotation of the second leg portion relative to the first leg portion about the second axis of rotation.

Implementations of the disclosure may include one or more of the following optional features. In some implementations, the first leg portion defines a longitudinal axis, the first axis of rotation is perpendicular to the longitudinal axis, and the second axis of rotation is perpendicular to the longitudinal axis. The first axis of rotation may be parallel to the second axis of rotation. In some examples, the first pulley and the second pulley are sized to cause a 2:1 ratio of the rotation of the second leg portion about the second axis of rotation to the rotation of the first leg portion about the first axis of rotation. The first pulley may have 60 teeth and the second pulley may have 30 teeth.

In some implementations, the first leg portion defines a proximal end at the first end portion of the first leg portion, a distal end at the second end portion of the first leg portion, and a first length between the proximal end of the first leg portion and the distal end of the first leg portion. In these implementations, the second leg portion defines a proximal end at the first end portion of the second leg portion, a distal end at the second end portion of the second leg portion, and a second length between the proximal end of the second leg portion and the distal end of the second leg portion. Here, the first length is substantially equal to the second length.

In some examples, the robotic leg further includes a rotary motor arranged to drive rotation of the first leg portion about the first axis of rotation. The rotary motor may define a rotary axis, and the rotary axis may be arranged coincident with the first axis of rotation. As such, the rotary motor may be attached to the first leg portion and include a rotor arranged to rotate about the rotary axis. The rotary motor may also include a stator arranged concentrically around the rotor, the stator configured for attachment to a robot or the first pulley. The rotary motor may form a hip joint of the robot.

While the robotic leg includes the rotary motor arranged to drive rotation of the first pulley in the above examples, in other examples the robotic leg includes a linear actuator disposed on the hip and having a translatable actuator arm pivotally coupled to the first leg portion. In these examples, actuation of the translatable actuator arm of the linear actuator causes rotation of the first end portion of the first leg portion about the first axis of rotation. Whether the robotic leg includes the rotary motor or the linear actuator, the robotic leg may also include a belt tensioner disposed on the first leg portion and in contact with the timing belt, the belt tensioner configured to adjustably set a tension of the timing belt.

Another aspect of the disclosure provides a method of operating a robotic leg that includes rotating a first leg portion about a first axis of rotation, the first leg portion having a first end portion rotatably coupled to a first pulley, the rotation of the first leg portion causing rotation of a second pulley via a timing belt trained about the first pulley and the second pulley. The second pulley is rotatably coupled to a second end portion of the first leg portion and has a second axis of rotation. The rotation of the second pulley causes rotation of a second leg portion relative to the first leg portion about the second axis of rotation. The second leg portion has a first end portion and a second end portion, the first end portion of the second leg portion fixedly attached to the second pulley.

This aspect may include one or more of the following optional features. The first leg portion may define a longitudinal axis, the first axis of rotation may be perpendicular to the longitudinal axis, and the second axis of rotation may be perpendicular to the longitudinal axis. The first axis of rotation may be parallel to the second axis of rotation. In some examples, the first pulley and the second pulley are sized to cause a 2:1 ratio of the rotation of the second leg portion about the second axis of rotation to the rotation of the first leg portion about the first axis of rotation. The first pulley may have 60 teeth and the second pulley may have 30 teeth.

In some examples, the first leg portion defines a proximal end at the first end portion of the first leg portion, a distal end at the second end portion of the first leg portion, and a first length between the proximal end of the first leg portion and the distal end of the first leg portion. In these examples, the second leg portion defines a proximal end at the first end portion of the second leg portion, a distal end at the second end portion of the second leg portion, and a second length between the proximal end of the second leg portion and the distal end of the second leg portion. Here, the first length is substantially equal to the second length.

In some implementations, the method also includes actuating a rotary motor arranged to drive the rotation of the first leg portion about the first axis of rotation. The rotary motor may define a rotary axis, and the rotary axis may be arranged coincident with the first axis of rotation. The rotary motor may include a rotor attached to the first leg portion and arranged to rotate about the rotary axis. The rotary motor may include a stator arranged concentrically around the rotor, the stator configured for attachment to a robot or the first pulley.

In other examples, the method also includes actuating a translatable actuator arm of a linear actuator to rotate the first leg portion about the first axis of rotation. In these examples, the linear actuator is disposed on a hip, the first pulley is fixedly attached to the hip, and the translatable actuator arm is pivotally coupled to the first leg portion. Additionally or alternatively, the method may also include adjusting a belt tensioner disposed on the first leg portion and in contact with the timing belt to adjustably set a tension of the timing belt.

Another aspect of the disclosure provides a method of operating a robotic leg that includes a first leg portion having a first end portion and a second end portion, and a second leg portion having a first end portion and a second end portion. The first end portion of the first leg portion has a first axis of rotation and the second end portion of the first leg portion has a second axis of rotation. The first end portion of the second leg portion is rotatably coupled to the second end portion of the first leg portion for rotation about the second axis of rotation. The method also includes coupling rotation of the first leg portion about the first axis of rotation to rotation of the second leg portion about the second axis of rotation, the coupling causing a 2:1 ratio of the rotation of the second leg portion about the second axis of rotation to the rotation of the first leg portion about the first axis of rotation.

This aspect may include one or more of the following optional features. In some examples, the method further includes training a timing belt about a first pulley defining the first axis of rotation and a second pulley defining the second axis of rotation. In these examples, the first pulley is rotatably coupled to the first end portion of the first leg portion, and the second pulley is rotatably coupled to the second end portion of the first leg portion, while the second pulley is fixedly attached to the first end portion of the second leg portion.

Another aspect of the disclosure provides a robotic leg that includes a first leg portion having a first end portion and a second end portion, and a second leg portion having a first end portion and a second end portion. The first end portion of the first leg portion has a first axis of rotation and the second end portion of the first leg portion has a second axis of rotation. The first end portion of the second leg portion is rotatably coupled to the second end portion of the first leg portion for rotation about the second axis of rotation. The robotic leg also includes a coupler coupling rotation of the first leg portion about the first axis of rotation to rotation of the second leg portion about the second axis of rotation, the coupling causing a 2:1 ratio of the rotation of the second leg portion about the second axis of rotation to the rotation of the first leg portion about the first axis of rotation.

This aspect may include one or more of the following optional features. In some examples, the robotic leg further includes a first pulley rotatably coupled to the first end portion of the first leg portion. A second pulley is rotatably coupled to the second end portion of the first leg portion, and a timing belt is trained about the first pulley and the second pulley. The first pulley defines the first axis of rotation and the second pulley defines the second axis of rotation. The timing belt synchronizes rotation of the first leg portion about the first axis of rotation and rotation of the second leg portion about the second axis of rotation.

In yet another aspect of the disclosure, a robotic leg includes a first leg portion having a first end portion and a second end portion, a first pulley fixedly attached to the first end portion of the first leg portion, a second pulley rotatably coupled to the second end portion of the first leg portion, and a second leg portion having a first end portion and a second end portion. The first pulley defines a first axis of rotation the second pulley defines a second axis of rotation, and the first end portion of the second leg portion is fixedly attached to the second pulley. The robotic leg also includes a timing belt trained about the first pulley and the second pulley for synchronizing rotation of the first pulley about the first axis of rotation and rotation of the second pulley about the second axis of rotation. Rotation of the first pulley about the first axis of rotation causes rotation of the first leg portion relative to the second leg portion about the second axis of rotation.

Implementations of the disclosure may include one or more of the following optional features. In some implementations, the first leg portion defines a longitudinal axis, the first axis of rotation is perpendicular to the longitudinal axis, and the second axis of rotation is perpendicular to the longitudinal axis. The first axis of rotation may be parallel to the second axis of rotation. In some examples, the first pulley and the second pulley are sized to cause a 2:1 ratio of the rotation of the second leg portion about the second axis of rotation to the rotation of the first leg portion about the first axis of rotation. The first pulley may have 60 teeth and the second pulley may have 30 teeth.

In some implementations, the first leg portion defines a proximal end at the first end portion of the first leg portion, a distal end at the second end portion of the first leg portion, and a first length between the proximal end of the first leg portion and the distal end of the first leg portion. In these implementations, the second leg portion defines a proximal end at the first end portion of the second leg portion, a distal end at the second end portion of the second leg portion, and a second length between the proximal end of the second leg portion and the distal end of the second leg portion. Here, the first length is substantially equal to the second length.

In some examples, the robotic leg further includes a rotary motor arranged to drive rotation of the first pulley about the first axis of rotation. The rotary motor may define a rotary axis, and the rotary axis may be arranged coincident with the first axis of rotation. As such, the rotary motor may be attached to the first pulley and include a rotor arranged to rotate about the rotary axis. The rotary motor may also include a stator arranged concentrically around the rotor, the stator configured for attachment to a robot or the first end portion of the first portion of the leg. The rotary motor may form a hip joint of the robot.

While the robotic leg includes the rotary motor arranged to drive rotation of the first pulley in the above examples, in other examples the robotic leg includes a hip rotatably coupled to the first pulley and a linear actuator disposed on the hip and having a translatable actuator arm pivotally coupled to the first leg portion. In these examples, actuation of the translatable actuator arm of the linear actuator causes rotation of the first pulley fixedly attached to the first end portion of the first leg portion about the first axis of rotation. Whether the robotic leg includes the rotary motor or the linear actuator, the robotic leg may also include a belt tensioner disposed on the first leg portion and in contact with the timing belt, the belt tensioner configured to adjustably set a tension of the timing belt.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 7A-7D are schematic views of an example variable length leg prismatically moving from a fully expanded position to a fully retracted position.

Like reference symbols in the various drawings indicate like elements.

DETAILED DESCRIPTION

Figure 1A:
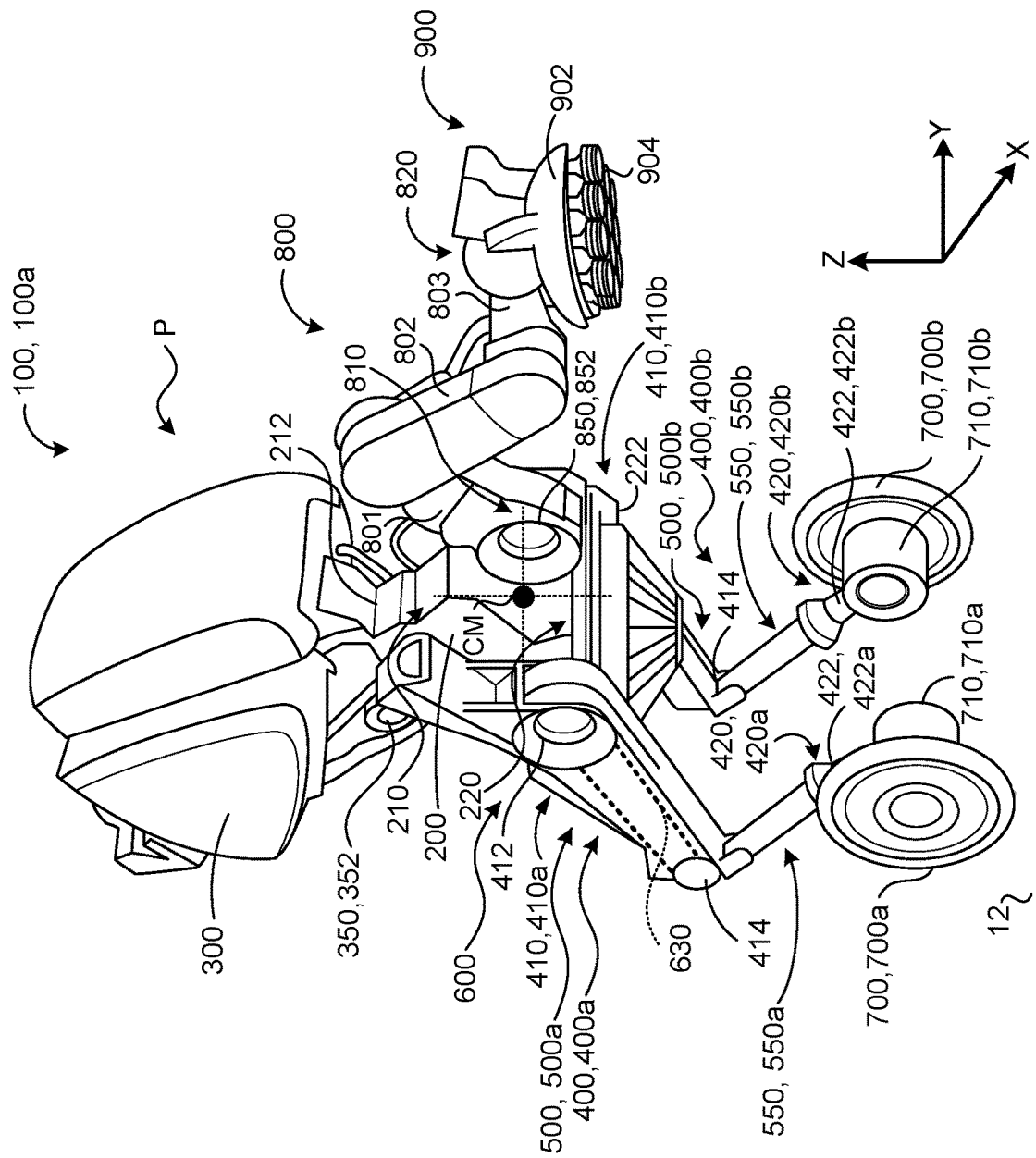
FIG. 1A is schematic view of an example robot.

Referring to FIGS. 1A-1E, in some implementations, a robot 100, 100a includes an inverted pendulum body (IPB) 200, a counter-balance body 300 disposed on the IPB 200, at least one leg 400 having a first end 410 coupled to the IPB 200 and a second end 420, and a drive wheel 700 rotatably coupled to the second end 420 of the at least one leg 400. The robot 100 has a vertical gravitational axis $V_g$ (FIGS. 1B and 1C) along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 200 has first and second end portions 210, 220 and may be interchangeably referred to as a torso 200 for the robot 100. For instance, the IPB 200 may define a length between a first end 212 associated with the first end portion 210 and a second end 222 associated with the second end portion 220. In some examples, a point of delineation separating the first and second end portions 210, 220 is at a midpoint between the first end 212 and the second end 222, so that the first end portion 210 encompasses 50-percent of the length of the IPB 200 and the second end portion 220 encompasses the remaining 50-percent of the length of the IPB 200. In other examples, the point of delineation separating the first and second end portions 210, 220 of the IPB 200 is closer to one of the first end 212 or the second end 222 so that one of the first end portion 210 or the second end portion 220 extends along a larger portion of the length of the IPB 200 than the other one of the first end portion 210 or the second end portion 220. For instance, the first end portion 210 extending from the first end 212 may encompass 90-, 80-, 70-, 60-, 40-, 30-, 20-, 10-percent of the length of the IPB 200 while the second end portion 220 extending from the second end 222 may encompass the remaining 10-, 20-, 30-, 60-, 70-, 80-, 90-percent of the length of the IPB 200.

In some implementations, the counter-balance body 300 is disposed on the first end portion 210 of the IPB 200 and configured to move relative to the IPB 200. The counter-balance body 300 may be interchangeably referred to as a tail 300. A back joint bk, 350 may rotatably couple the counter-balance body 300 to the first end portion 210 of the IPB 200 to allow the counter-balance body 300 to rotate relative to the IPB 200. In the example shown, the back joint bk, 350 supports the counter-balance body 300 to allow the counter-balance body 300 to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100.

Figure 1B:
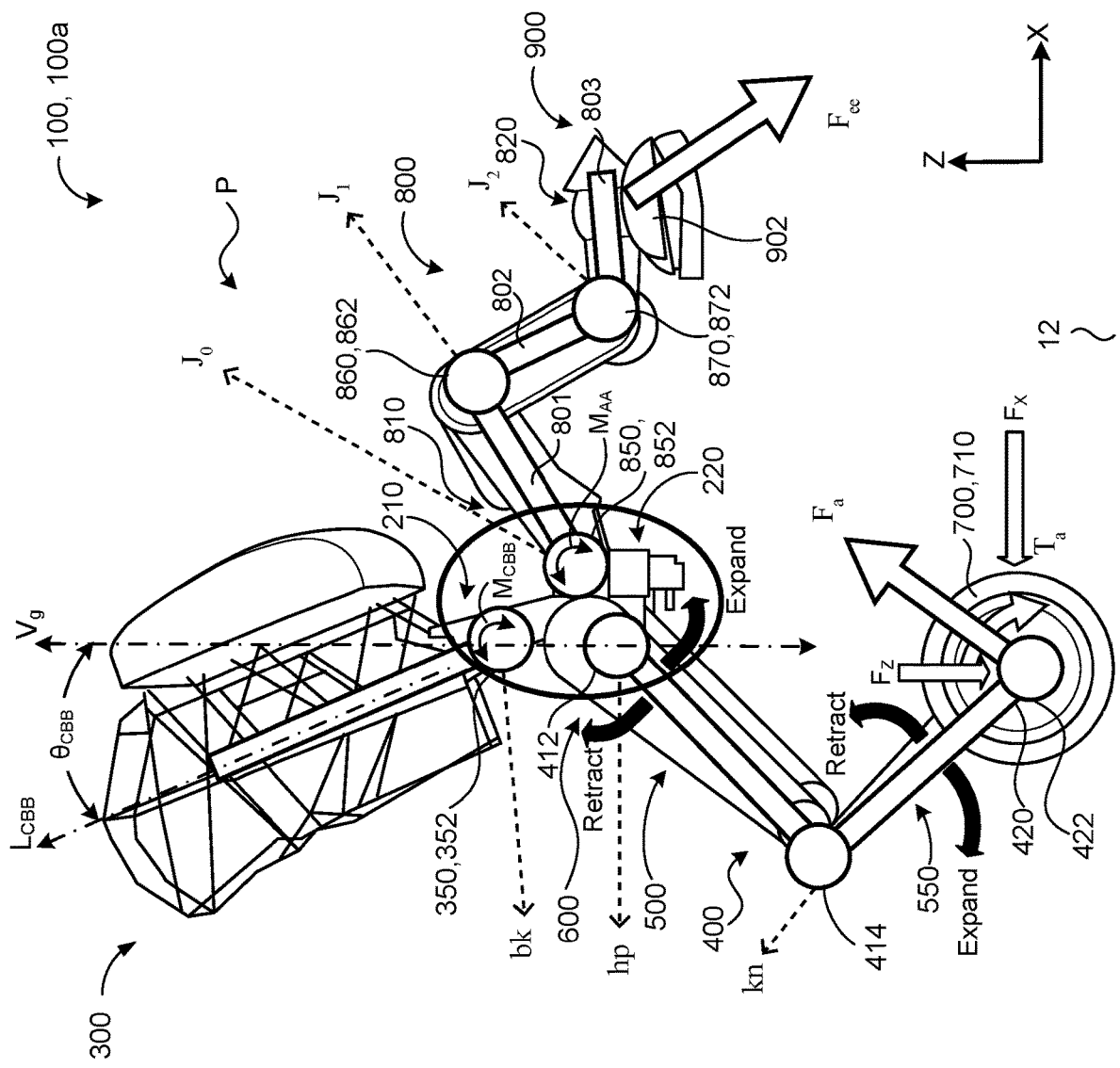
FIGS. 1B and 1C are schematic views of the robot of FIG. 1A showing a counter-balance body moving relative to an inverted pendulum body of the robot.

Referring to FIG. 1B, the counter-balance body 300 has a longitudinal axis $L_{CBB}$ extending from the back joint bk, 350 and is configured to pivot at the back joint bk, 350 to move/pitch around the lateral axis (y-axis) relative to the IPB 200 (in both the clockwise and counter-clockwise directions relative to the view shown in FIG. 1B). Accordingly, the back joint bk, 350 may be referred to as a pitch joint. The pose P of the robot 100 may be defined at least in part by a rotational angle $\theta_{CBB}$ of the counter-balance body 300 relative to the vertical gravitational axis $V_g$. Moreover, the counter-balance body 300 may generate/impart a moment $M_{CBB}$ (rotational force) at the back joint bk, 350 based on the rotational angle $\theta_{CBB}$ of the counter-balance body 300 relative to the vertical gravitational axis $V_g$. Thus, movement by the counter-balance body 300 relative to the IPB 200 alters the pose P of the robot 100 by moving the CM of the robot 100 relative to the vertical gravitational axis $V_g$. A rotational actuator 352 (e.g., a tail actuator) may be positioned at or near the back joint bk, 350 for controlling movement by the counter-balance body 300 (e.g., tail) about the lateral axis (y-axis). The rotational actuator 352 may include an electric motor, electro-hydraulic servo, piezo-electric actuator, solenoid actuator, pneumatic actuator, or other actuator technology suitable for accurately effecting movement of the counter-balance body 300 relative to the IPB 200.

The rotational movement by the counter-balance body 300 relative to the IPB 200 alters the pose P of the robot 100 for balancing and maintaining the robot 100 in an upright position. For instance, similar to rotation by a flywheel in a conventional inverted pendulum flywheel, rotation by the counter-balance body 300 relative to the gravitational vertical axis $V_g$ generates/imparts the moment $M_{CBB}$ at the back joint bk, 350 to alter the pose P of the robot 100. By moving the counter-balance body 300 relative to the IPB 200 to alter the pose P of the robot 100, the CM of the robot 100 moves relative to the gravitational vertical axis Vg to balance and maintain the robot 100 in the upright position in scenarios when the robot 100 is moving and/or carrying a load. However, by contrast to the flywheel portion in the conventional inverted pendulum flywheel that has a mass centered at the moment point, the counter-balance body 300 includes a corresponding mass that is offset from the moment $M_{CBB}$ imparted at the back joint bk, 350. In some configurations, a gyroscope disposed at the back joint bk, 350 could be used in lieu of the counter-balance body 300 to spin and impart the moment $M_{CBB}$ (rotational force) for balancing and maintaining the robot 100 in the upright position.

Figure 1C:
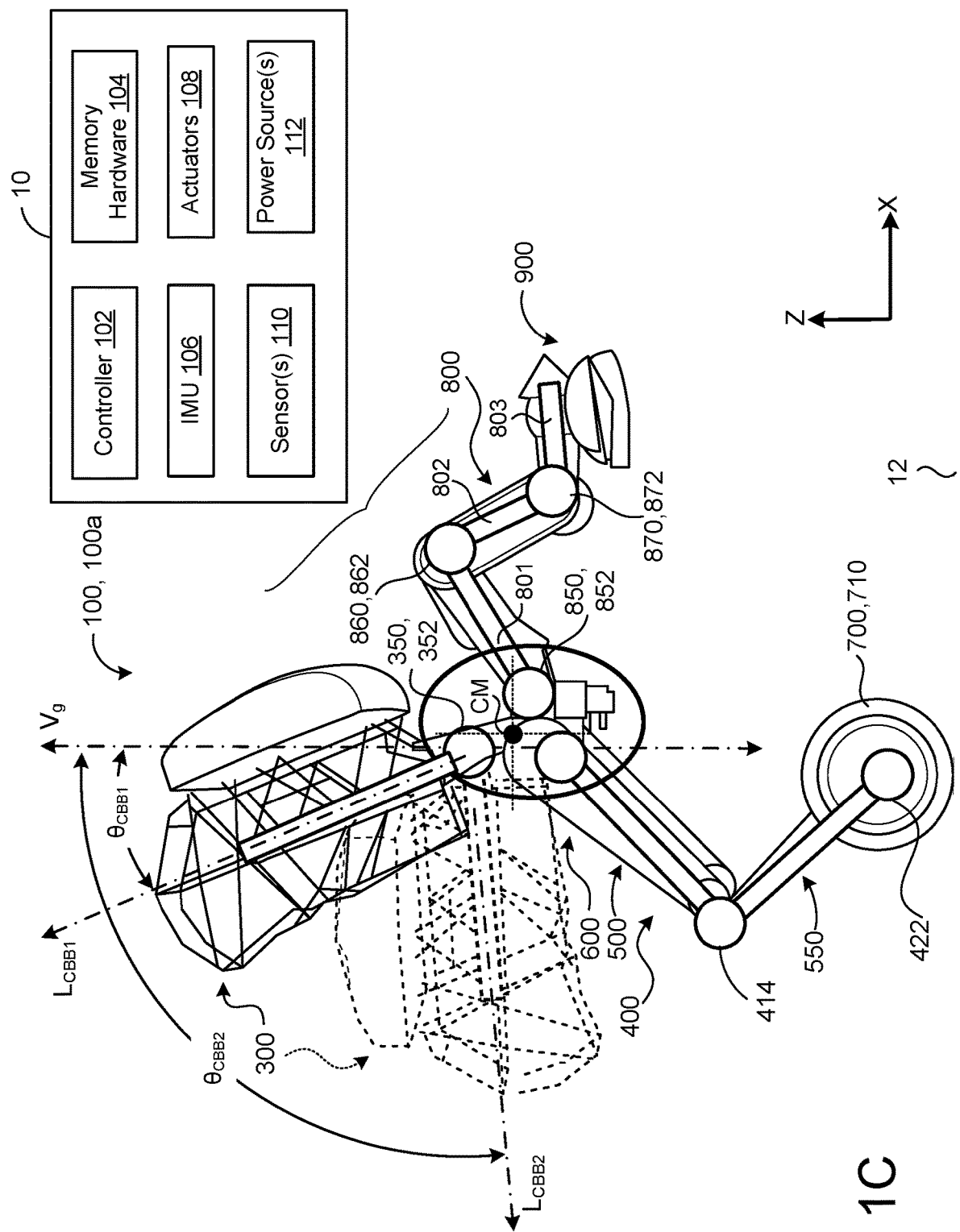

Referring to FIG. 1C, the counter-balance body 300 may rotate (e.g., pitch) about the back joint bk, 350 in both the clockwise and counter-clockwise directions (e.g., about the y-axis in the "pitch direction" relative to the view shown in FIG. 1C) to create an oscillating (e.g., wagging) movement. For example, the counter-balance body 300 may move/pitch about the lateral axis (y-axis) in a first direction (e.g., counter-clockwise direction) from a first position (solid lines) associated with longitudinal axis $L_{CBB1}$, having a first rotational angle $\theta_{CBB1}$ relative to the vertical gravitation axis $V_g$, to a second position (dashed lines) associated with longitudinal axis $L_{CBB2}$, having a second rotational angle $\theta_{CBB2}$ relative to the vertical gravitation axis $V_g$. Movement by the counter-balance body 300 relative to IPB 200 from the first position to the second position causes the CM of the robot 100 to shift and lower toward the ground surface 12.

The counter-balance body 300 may also move/pitch about the lateral axis (y-axis) in an opposite second direction (e.g., clockwise direction) from the second position (dashed lines) back to the first position or another position either before or beyond the first position. Movement by the counter-balance body 300 relative to the IPB 200 in the second direction away from the second position (dashed lines) causes the CM of the robot 100 to shift and raise away from the ground surface 12. Thus, increasing the rotational angle $\theta_{CBB}$ of the counter-balance body 300 relative to the vertical gravitational axis $V_g$ may cause the CM of the robot 100 to lower toward the ground surface 12, while decreasing the rotational angle $\theta_{CBB}$ of the counter-balance body 300 relative to the vertical gravitational axis $V_g$ may cause the CM of the robot 100 to raise away from the ground surface 12 and/or shift forward or backward relative to the point of contact between the drive wheels 700 and the ground surface 12. In some examples, the longitudinal axis $L_{CBB}$ of the counter-balance body 300 is coincident with the vertical gravitational axis $V_g$. The counter-balance body 300 may oscillate between movements in the first and second directions to create the wagging movement. The rotational velocity of the counter-balance body 300 when moving relative to the IPB 200 may be constant or changing (accelerating or decelerating) depending upon how quickly the pose P of the robot 100 needs to be altered for dynamically balancing the robot 100.

The first position (solid lines) associated with $L_{CBB1}$ and the second position (dashed lines) associated with $L_{CBB1}$ of the counter-balance body 300 of FIG. 1C are depicted as exemplary positions only, and are not intended to represent a complete range of motion of the counter-balance body 300 relative to the IPB 200. For instance, in other examples, the counter-balance body 300 may move/pitch around the lateral axis (y-axis) in the first direction (e.g., counter-clockwise direction) to positions having rotational angles $\theta_{CBB}$ greater than the second rotational angle $\theta_{CBB2}$ associated with the second position (dashed lines) and/or in the second direction (e.g., clockwise direction) to positions having rotational angles $\theta_{CBB}$ less than the first rotational angle $\theta_{CBB1}$ associated with the first position (solid lines). Moreover, the counter-balance body 300 may move/pitch around the lateral axis (y-axis) relative to the IPB 200 at any position between the first position (solid lines) and the second position (dashed lines) shown in FIG. 1C.

Referring back to FIGS. 1A and 1B, the at least one leg 400 includes a right leg 400a and a left leg 400b. The right leg 400a includes a corresponding first end 410, 410a rotatably coupled to the second end portion 220 of the IPB 200 and a corresponding second end 420, 420a rotatably coupled to a corresponding right drive wheel 700, 700a. A right hip joint 412 may rotatably couple the first end 410a of the right leg 400a to the second end portion 220 of the IPB 200 to allow at least a portion of the right leg 400a to move/pitch around the lateral axis (y-axis) relative to the IPB 200. An actuating device 600 associated with the hip joint 412 may cause an upper portion 500, 500a of the right leg 400a to move/pitch around the lateral axis (y-axis) relative to the IPB 200. In some configurations, the right leg 400a includes the corresponding upper portion 500, 500a and a corresponding lower portion 550, 550a. The upper portion 500a may extend from the hip joint 412 at the first end 410a to a corresponding knee joint 414 and the lower portion 550a may extend from the knee joint 414 to the second end 420a.

The right leg 400a may include a corresponding right ankle joint 422, 422a configured to rotatably couple the right drive wheel 700a to the second end 420a of the right leg 400a. Here, the right ankle joint 422a may be associated with a wheel axle coupled for common rotation with the right drive wheel 700a and extending substantially parallel to the lateral axis (y-axis). The right drive wheel 700a may include a corresponding torque actuator (drive motor) 710, 710a configured to apply a corresponding axle torque $T_a$ (FIG. 1B) for rotating the right drive wheel 700a about the ankle joint 422a to move the right drive wheel 700a across the ground surface 12 along the fore-aft axis (x-axis). For instance, the axle torque $T_a$ may cause the right drive wheel 700a to rotate in a first direction for moving the robot 100 in a forward direction along the fore-aft axis (x-axis) and/or cause the right drive wheel 700a to rotate in an opposite second direction for moving the robot 100 in a rearward direction along the fore-aft axis (x-axis).

The left leg 400b similarly includes a corresponding first end 410, 410b rotatably coupled to the second end portion 220 of the IPB 200 and a corresponding second end 420, 420b rotatably coupled to a corresponding left drive wheel 700, 700b. A corresponding hip joint 412 may rotatably couple the first end 410b of the left leg 400b to the second end portion 220 of the IPB 200 to allow at least a portion of the left leg 400b to move/pitch around the lateral axis (y-axis) relative to the IPB 200. A corresponding actuating device 600 associated with the left hip joint 412 may cause a corresponding upper portion 500, 500b of the left leg 400b to move/pitch around the lateral axis (y-axis) relative to the IPB 200. As with the right leg 400a, the left leg 400b may include the corresponding upper portion 500, 500b and a corresponding lower portion 550, 550b. The upper portion 500b may extend from the hip joint 412 at the first end 410b to a corresponding knee joint 414 and the lower portion 550b may extend from the knee joint 414 to the second end 420b.

The left leg 400b may include a corresponding left ankle joint 422, 422b configured to rotatably couple the left drive wheel 700b to the second end 420b of the left leg 400b. Here, the left ankle joint 422b may be associated with a wheel axle coupled for common rotation with the left drive wheel 700b and extending substantially parallel to the lateral axis (y-axis). As with the right drive wheel 700a, the left drive wheel 700b may include a corresponding torque actuator (e.g., drive motor) 710b configured to apply a corresponding axle torque $T_a$ for rotating the left drive wheel 700b about the ankle joint 422b to move the left drive wheel 700b across the ground surface 12 along the fore-aft axis (x-axis). For instance, the axle torque $T_a$ may cause the left drive wheel 700b to rotate in the first direction for moving the robot 100 in the forward direction along the fore-aft axis (x-axis) and/or cause the left drive wheel 700b to rotate in the opposite second direction for moving the robot 100 in the rearward direction along the fore-aft axis (x-axis).

The corresponding axle torques $T_a$ applied to each of the drive wheels 700a, 700b may vary to maneuver the robot 100 across the ground surface 12. For instance, an axle torque Tax applied to the right drive wheel 700a that is greater than an axle torque Tat applied to the left drive wheel 700b may cause the robot 100 to turn to the left, while applying a greater axle torque $T_a$ to the left drive wheel 700b than to the right drive wheel 700a may cause the robot 100 to turn to the right. Similarly, applying substantially the same magnitude of axle torque $T_a$ to each of the drive wheels 700a, 700b may cause the robot 100 to move substantially straight across the ground surface 12 in either the forward or reverse directions. The magnitude of axle torque $T_a$ applied to each of the drive wheels 700a, 700b also controls velocity of the robot 100 along the fore-aft axis (x-axis). Optionally, the drive wheels 700a, 700b may rotate in opposite directions to allow the robot 100 to change orientation by swiveling on the ground surface 12. Thus, each axle torque $T_a$ may be applied to the corresponding drive wheel 700 independent of the axle torque $T_a$ (if any) applied to the other drive wheel 700.

FIG. 1B shows the right ankle joint 422a (e.g., wheel axle) rotatably coupling the right drive wheel 700a to the second end 420a of the right leg 400a and exerting an axle force $F_a$. The left ankle joint 422b similarly exerts a corresponding axle force $F_a$ (not shown). The axle forces $F_a$ may assist in adjusting the pose P of the robot 100 and/or be controlled for balancing the robot 100. The axle force $F_a$ is generated based on a magnitude of horizontal force $F_x$ exerted on the corresponding ankle joint 422 along the fore-aft axis (x-axis), a magnitude of vertical force $F_z$ exerted on the corresponding ankle joint 422 along a vertical axis (z-axis), and the magnitude of axle torque $T_a$ applied by the corresponding torque actuator 710 to the corresponding wheel 700.

In some implementations, each leg 400 has a variable length extending between the first and second ends 410, 420 of the corresponding leg 400. For instance, the lower portion 550 of each leg 400 may rotate relative to the corresponding upper portion 500 about the knee joint 414 to enable the leg 400 to retract and expand. Referring to FIG. 1B, rotation by the lower portion 550 about the knee joint 414 relative to the upper portion 500 in the counter-clockwise direction may cause the leg 400 to retract. At the same time, the upper portion 500 may rotate about the hip joint 412 relative to the IPB 200 in the clockwise direction to cause the leg 400 to retract. Similarly, rotation by the lower portion 550 about the knee joint 414 relative to the upper portion 500 in the clockwise direction and/or rotation by the upper portion 500 about the hip joint 412 relative to the IPB 200 in the counter-clockwise direction may cause the leg 400 to expand. As used herein, retracting the length of the leg 400 may cause a height of the corresponding leg 400 with respect to the ground surface 12 to reduce while expanding the length of the leg 400 may cause the height of the corresponding leg 400 with respect to the ground surface 12 to increase. In some examples, the height of the leg 400 is defined as a distance along the vertical axis (z-axis) between the ground surface 12 (or the corresponding ankle joint 422) supporting the robot 100 and the corresponding knee joint 414. In other examples, the height of the leg 400 is defined as a distance along the vertical axis (z-axis) between the ground surface 12 (or the corresponding ankle joint 422) and the corresponding hip joint 412 rotatably coupling the corresponding first end 410 of the leg 400 to the second end portion 220 of the IPB 200.

In some implementations, retracting the length of both legs 400 causes an overall height of the robot 100 to decrease while expanding the length of both legs 400 causes the overall height of the robot 100 to increase. For instance, the robot 100 may need to lower, for example by crouching, to clear obstacles such as, without limitation, doorways, overhangs, light fixtures, or ceilings. It may also be desirable to lower the robot 100 to shift the CM downward to increase stability in certain scenarios. On the other hand, an increase to the overall height of the robot 100 may be required to reach or place a target object on a shelf Altering the height of the robot 100 simultaneously alters the pose P, and may cause substantive shifts in the CM of the robot 100 that require actuation of the counter-balance body 300 to move relative to the IPB 200 to maintain balance of the robot 100. The heights of the legs 400 may be dynamically controlled to target heights to assist with turning maneuvers as the robot 100 traverses along the ground surface 12. For instance, dynamically adjusting the height of each leg 400 independently from one another may allow the robot 100 to lean and bank into turns, thereby enhancing maneuverability of the robot 100 while traversing across the ground surface 12.

In some implementations, the robot 100 further includes one or more appendages, such as an articulated arm 800 disposed on the IPB 200 and configured to move relative to the IPB 200. The articulated arm 800 may have five-degrees of freedom. Moreover, the articulated arm 800 may be interchangeably referred to as a manipulator arm, a manipulator head, or simply an appendage. While FIGS. 1A-1E show the articulated arm 800 disposed on the second end portion 220 of the IPB 200, the articulated arm 800 may be disposed on the first end portion 210 of the IPB 200 in other configurations. The articulated arm 800 extends between a proximal first end 810 and a distal second end 820. Referring to FIG. 1B, the first end 810 connects to the IPB 200 at a first articulated arm joint $J_O$ 850. The first articulated arm joint $J_O$ 850 may be disposed between the left and right hip joints 412 to center the articulated arm 800 between the left and right sides of the IPB 200. In some examples, the first articulated arm joint $J_O$ 850 rotatably couples the proximal first end 810 of the articulated arm 800 to the IPB 200 to enable the manipulator arm 800 to rotate relative to the IPB 200. For instance, the articulated arm 800 may move/pitch about the lateral axis (y-axis) relative to the IPB 200. A rotational actuator 852 (e.g., manipulator head actuator) may be positioned at or near the first articulated arm joint $J_O$ 850 for rotating the articulated arm 800 (e.g., manipulator head) about the lateral axis (y-axis). The rotational actuator 852 may include an electric motor, electro-hydraulic servo, piezo-electric actuator, solenoid actuator, pneumatic actuator, or other actuator technology suitable for accurately effecting movement of the articulated arm 800.

In some scenarios, the articulated arm 800 rotates at the first articulated arm joint $J_O$ 850 about the lateral axis (y-axis) relative to the IPB 200 in the direction of gravity (e.g., in the clockwise direction relative to the view of FIG. 1B) to lower the CM of the robot 100. The robot 100 may lower the CM closer to the ground surface while executing turning maneuvers. The counter-balance body 300 may also simultaneously rotate about the lateral axis (y-axis) relative to the IPB 200 in the direction of gravity (e.g., in the counter-clockwise direction relative to the view of FIG. 1B) to assist in lowering the CM of the robot 100. Here, the articulated arm 800 and the counter-balance body 300 may cancel out any shifting in the CM of the robot 100 in the forward or rearward direction along the fore-aft axis (x-axis), while still effectuating the CM of the robot 100 shift downward closer to the ground surface 12.

An end effector 900 may be disposed on the distal second end 820 of the manipulator arm 800. The end effector 900 may include one or more actuators 902 (grippers) that may be configured to grip and manipulate a target object. Additionally or alternatively, the end effector 900 may employ a vacuum device and/or one or more suction cups 904 (FIG. 1A) configured to apply suction for gripping and holding a target object when the end effector 900 is positioned on the target object. FIG. 1B shows the end effector 900 exerting a corresponding end effector force $F_{ee}$. The manipulator arm 800 and/or the end effector 900 may include perception sensors for identifying objects in relation to the robot 100.

The articulated arm 800 may include two or more portions. In the examples shown in FIGS. 1A-1C, the articulated arm 800 includes a first portion 801, a second portion 802, and a third portion 803. The first portion 801 may extend between the proximal first end 810 connected to the IPB 200 via the first articulated arm joint $J_0$ 850 and a second articulated arm joint $J_1$ 860. The second portion 802 may extend between the second articulated arm joint $J_1$ 860 and a third articulated arm joint $J_2$ 870. The third portion 803 may extend between the third articulated arm joint $J_2$ 870 and the distal second end 820 of the articulated arm 800 that connects to the end effector 900. As with the first articulated arm joint $J_0$ 850, the second and third articulated arm joints $J_1$ 860, $J_2$ 870 may each be associated with a corresponding actuator 862, 872 configured to move each portion 802, 803 relative to one another and relative to the IPB 200. For instance, the rotational actuator 852 associated with the first articulated arm joint $J_0$ 850 may cause the first portion 801 of the articulated arm 800 to move/pitch about the lateral axis (y-axis) relative to the IPB 200. As the second and third portions 802, 803 of the articulated arm 800 are connected to the first portion 801 via the second and third articulated arm joints $J_1$ 860, $J_2$ 870, the rotation by the first portion 801 about the lateral axis (y-axis) at the first articulated arm joint $J_0$ 850 may also cause the second and third portions 802, 803 to simultaneously move relative to the IPB 200.

Similarly, the rotational actuator 862 associated with the second articulated arm joint $J_1$ 860 may cause the second portion 802 of the articulated arm 800 to move/pitch about the lateral axis (y-axis) relative to both the IPB 200 and the first portion 801 of the articulated arm 800. Moreover, the rotational actuator 872 associated with the third articulated arm joint $J_2$ 870 may cause the third portion 803 of the articulated arm 800 to move/pitch about the lateral axis (y-axis) relative to the IPB 200 and the first and second portions 801, 802 of the articulated arm 800. The actuators 852, 862, 872 may be controlled independently of one another to move the corresponding portions 801, 802, 803 alone or in concert for positioning the end effector 900 on a target object and/or altering the pose P of the robot 100.

In some configurations, the counter-balance body 300 corresponds to a first counter-balance body 300 disposed on the first end portion 210 of the IPB 200 and the articulated arm 800 corresponds to a second counter-balance body 800 disposed on the second end portion 220 of the IPB 200. Similar to the first counter-balance body 300 discussed above, the articulated arm 800 may be configured to move relative to the IPB 200 for altering the pose P of the robot 100 by moving the CM of the robot 100 relative to the vertical gravitational axis $V_g$. For instance, the articulated arm 800 may generate/impart a moment $M_{AA}$ (rotational force) (FIG. 1B) at the first articulated arm joint $J_0$ based on a rotational angle of the articulated arm 800 relative to the vertical gravitational axis $V_g$. Thus, the articulated arm 800 may move relative to the IPB 200 to alter the pose P of the robot 100 by moving the CM of the robot 100 relative to the vertical gravitational axis $V_g$. In some configurations, a gyroscope could be disposed at the first articulated arm joint $J_0$ to impart the moment $M_{AA}$ (rotational force) for maintaining balance of the robot 100 in the upright position.

Figure 1D:
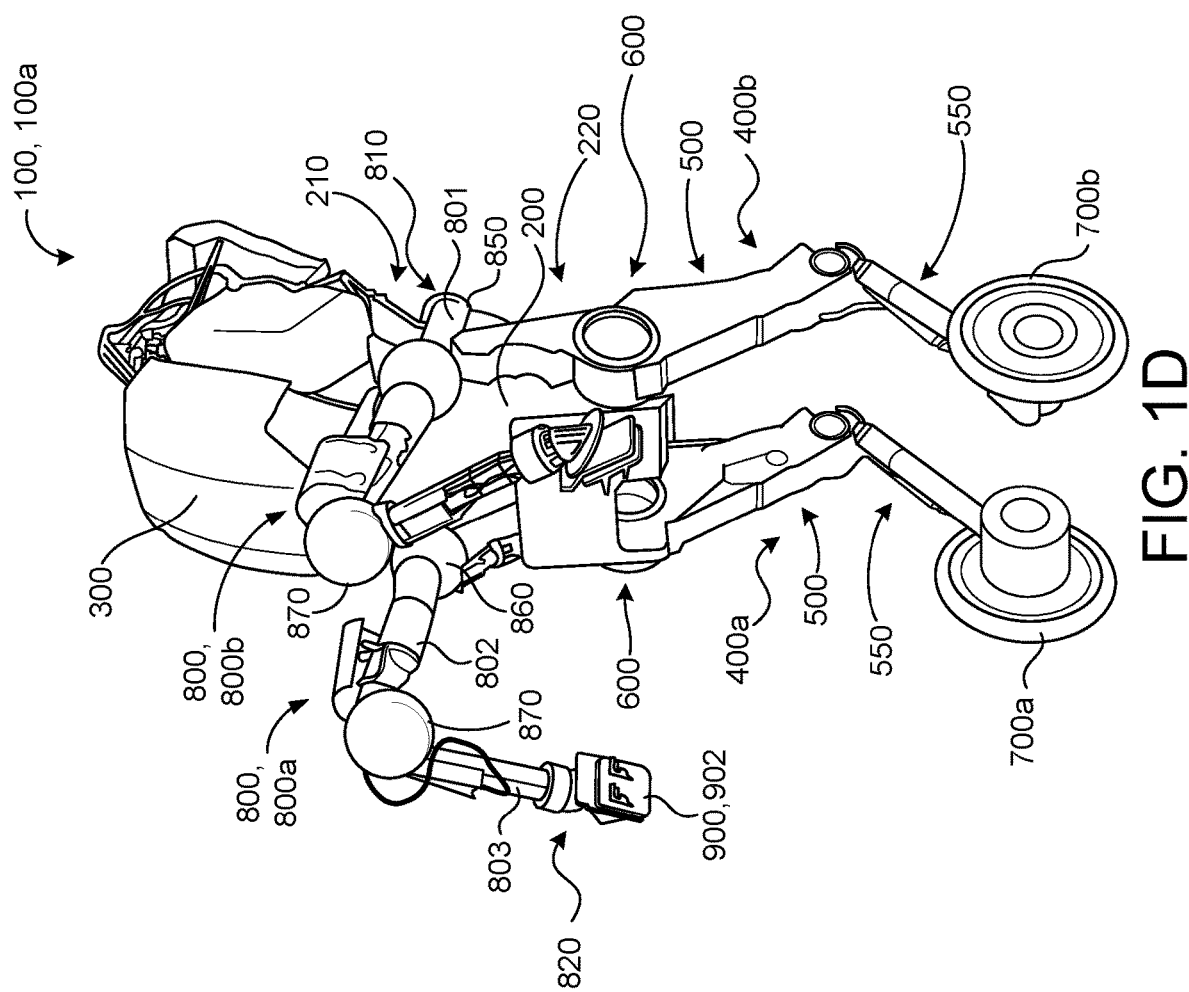
FIGS. 1D and 1E are schematic views showing an example robot having two appendages disposed on an inverted pendulum body.
Figure 1E:
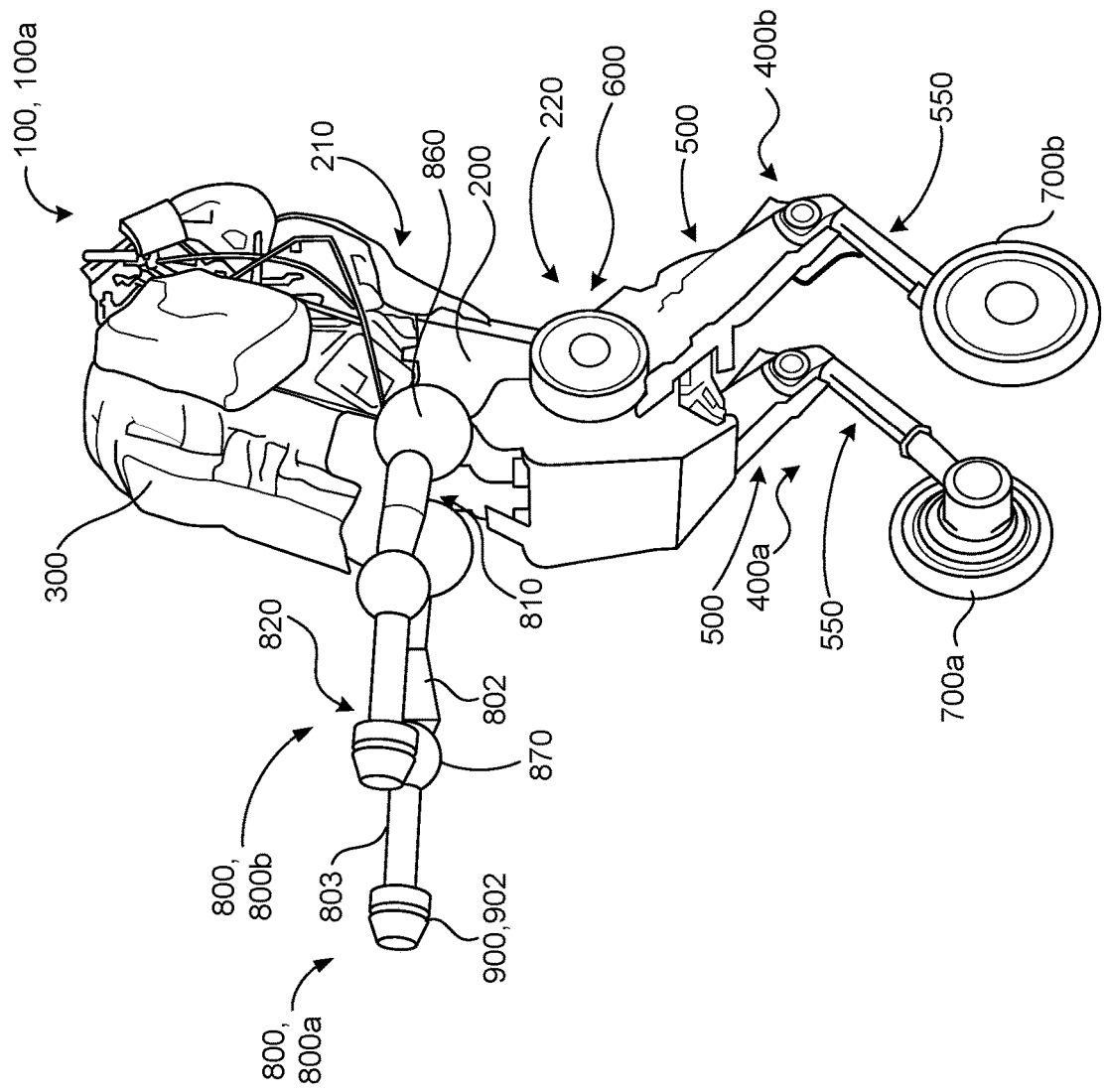

Referring to FIGS. 1D and 1E, in some implementations, the robot 100 includes left and right appendages (e.g., two articulated arms) 800a, 800b each disposed on the IPB 200 and configured to move relative to the IPB 200. The appendages 800a, 800b may be disposed on the first end portion 210 of the IPB 200 or the second end portion 220 of the IPB 200. As with the single articulated arm 800, each appendage 800a, 800b extends between a respective proximal first end 810 and a respective distal second end 820, and the first end 810 connects to the IPB 200 at a corresponding first articulated arm joint $J_0$ 850. Here, each first articulated arm joint $J_0$ 850 may be disposed on an opposite side of the IPB 200. Each appendage 800a, 800b may also include the one or more respective portions 801, 802, 803 connected by respective articulated arm joints $J_1$ 860, $J_2$ 870 as discussed above with reference to the single articulated arm 800 of FIGS. 1A-1C. Accordingly, each appendage 800a, 800b may be controlled to operate in substantially the same manner as the single articulated arm 800.

FIG. 1D shows the appendages 800a, 800b each having the corresponding first and second portions 801, 802 extending substantially parallel to one another and away from the IPB 200, while the corresponding third portion 803 extends substantially perpendicular to the first and second portions 801, 802 to point the corresponding distal second end 820 downward toward the ground surface 12. Here, the position of the appendages 800a, 800b may align the end effectors 900 and associated actuators 902 to grasp and carry an object. The appendages 800a, 800b could also point downward as shown in FIG. 1D for adjusting the moment of inertia about the vertical z-axis to assist with turning maneuvers. FIG. 1E shows the appendages 800a, 800b fully extended/deployed outward from the IPB 200 with each appendage 800a, 800b having the corresponding portions 801, 802, 803 substantially aligned with one another and extending substantially parallel to the ground surface 12. In some examples, the robot 100 may fully extend one or both of appendages 800a, 800b as shown in FIG. 1E for adjusting the moment of inertia about the vertical z-axis.

Referring back to FIG. 1C, the robot 100 includes a control system 10 configured to monitor and control operation of the robot 100. In some implementations, the robot 100 is configured to operate autonomously and/or semi-autonomously. However, a user may also operate the robot 100 by providing commands/directions to the robot 100. In the example shown, the control system 10 includes a controller 102 (e.g., data processing hardware), memory hardware 104, an inertial measurement unit 106, actuators 108, one or more sensors 110, and one or more power sources 112. The control system 10 is not limited to the components shown, and may include additional or less components without departing from the scope of the present disclosure. The components may communicate via wireless or wired connections and may be distributed across multiple locations of the robot 100. In some configurations, the control system 10 interfaces with a remote computing device and/or a user. For instance, the control system 10 may include various components for communicating with the robot 100, such as a joystick, buttons, wired communication ports, and/or wireless communication ports for receiving inputs from the remote computing device and/or user, and providing feedback to the remote computing device and/or user.

The controller 102 corresponds to data processing hardware that may include one or more general purpose processors, digital signal processors, and/or application specific integrated circuits (ASICs). In some implementations, the controller 102 is a purpose-built embedded device configured to perform specific operations with one or more subsystems of the robot 100. The memory hardware 104 is in communication with the controller 102 and may include one or more non-transitory computer-readable storage media such as volatile and/or non-volatile storage components. For instance, the memory hardware 104 may be associated with one or more physical devices in communication with one another and may include optical, magnetic, organic, or other types of memory or storage. The memory hardware 104 is configured to, inter alia, store instructions (e.g., computer-readable program instructions), that when executed by the controller 102, cause the controller to perform numerous operations, such as, without limitation, altering the pose P of the robot 100 for maintaining balance, maneuvering the robot 100 across the ground surface 12, transporting objects, and/or executing a sit-to-stand routine. The controller 102 may directly or indirectly interact with the inertial measurement unit 106, the actuators 108, the sensor(s) 110, and the power source(s) 112 for monitoring and controlling operation of the robot 100.

The inertial measurement unit 106 is configured to measure an inertial measurement indicative of a movement of the robot 100 that results in a change to the pose P of the robot 100. The inertial measurement measured by the inertial measurement unit 106 may indicate a translation or shift of the CM of the robot 100 relative to the vertical gravitational axis $V_g$. The translation or shift of the CM may occur along one or more of the fore-aft axis (x-axis), the lateral axis (y-axis), or the vertical axis (z-axis). For instance, the inertial measurement unit 106 may detect and measure an acceleration, a tilt, a roll, a pitch, a rotation, or yaw of the robot 100, as the inertial measurement, using an initial pose P as an inertial reference frame. To detect and to measure, the inertial measurement unit 106 may include at least one of a tri-axial accelerometer, a tri-axial magnetometer, or a tri-axial gyroscope. The tri-axial accelerometer includes circuitry to sense the movement of the robot 100 between poses along a straight line or an axis, such as a position and an orientation of the inertial measurement unit 106. In some examples, the accelerometer may use a mass-spring system or a vibration system configured to determine an acceleration corresponding to a displacement of a mass in the mass-spring system or a stress related to a vibration in the vibration system. The inertial measurement unit 106 may also include a gyroscope, such as the tri-axial gyroscope, to measure a rate of rotation about a defined axis. The gyroscope is configured to sense rotation of the inertial measurement unit 106 such that a sensed rotation is a portion of the inertial measurement output to the controller 102. The controller 102 receives the inertial measurement of the inertial measurement unit 106 and determines shifts in the CM of the robot 100 relative to the vertical gravitational axis $V_g$. Thus, the gyroscope senses rotations of the robot 100 as the robot 100 moves with the gyroscope. The inertial measurement unit 106 may include more than one of the tri-axial accelerometer, the tri-axial magnetometer, or the tri-axial gyroscope to increase accuracy of the inertial measurement unit 106. In some examples, the inertial measurement unit 106 produces three dimensional measurements of a specific force and an angular rate. The inertial measurement unit 106 may also include a microprocessor.

The controller 102 is configured to process data relating to the inertial measurement unit 106, the actuators 108, and the sensor(s) 110 for operating the robot 100. The controller 102 receives an inertial measurement from the inertial measurement unit 106 (e.g., via a wired or wireless connection) disposed on the robot 100 and instructs actuation of at least one of the actuators 108 to alter a pose P of the robot 100 to move the CM of the robot 100 relative to the vertical gravitational axis $V_g$. In some examples, the controller 102 identifies changes in the inertial measurements between poses P and defines movements by at least one of the counter-balance body 300 or the articulated arm 800 for maintaining balance of the robot 100 by moving the CM relative to the vertical gravitational axis $V_g$.

The actuators 108 may include the tail actuator 352 connected to the tail 300 (e.g., counter-balance body), the actuating devices 600 each connected to the respective leg 400, the drive motors 710 each coupled to the respective drive wheel 700 of the corresponding leg 400, and the manipulator head actuator 852 connected to the manipulator head 800 (e.g., articulated arm). The tail actuator 352 is configured to move the tail 300 relative to the torso 200. For instance, the controller 102 may instruct actuation of the tail actuator 352 to move/pitch the tail 300 about the lateral axis (y-axis) relative to the torso 200. The manipulator head actuator 852 is configured to move the manipulator head 800 relative to the torso 200. For instance, the controller 102 may instruct actuation of the manipulator head actuator 852 to move/pitch the manipulator head 800 about the lateral axis (y-axis) relative to the torso 200. In some examples, the controller 102 actuates the manipulator head actuator 852 to operate the manipulator head 800 as a second counter-balance body for altering the pose P of the robot 100 by moving the CM of the robot 100 relative to the vertical gravitational axis $V_g$. The controller 102 may additionally or alternatively instruct actuation of at least one of the actuator 862 corresponding to the second articulated arm joint (e.g., second manipulator head joint) $J_1$ 860 or the actuator 862 corresponding to the third articulated arm joint (e.g., third manipulator head joint) $J_2$ 870 for moving at least one of the portions 801, 802, 803 of the manipulator head relative to one another and relative to the torso 200.

Each actuating device 600 (disposed at or near the corresponding hip joint 412) is configured to rotate the upper portion 500 of the respective leg 400 relative to the torso 200. For instance, the controller 102 may instruct actuation of the actuating device 600 associated with the right hip joint 412 to cause the upper portion 500a of the prismatic right leg 400a to move/pitch around the lateral axis (y-axis) relative to the torso 200. Similarly, the controller 102 may instruct actuation of the actuating device 600 associated with the left hip joint 412 to cause the upper portion 500b of the left leg 400b to move/pitch around the lateral axis (y-axis) relative to the torso 200.

Each drive motor 710 is configured to apply the corresponding axle torque (FIG. 1B) for rotating the respective drive wheel 700 about the corresponding ankle joint 422 to move the drive wheel 700 across the ground surface 12 along the fore-aft axis (x-axis). For instance, the axle torque $T_a$ may cause the drive wheel 700 to rotate in a first direction for moving the robot 100 in a forward direction along the fore-aft axis (x-axis) and/or cause the drive wheel 700 to rotate in an opposite second direction for moving the robot 100 in a rearward direction along the fore-aft axis (x-axis). The controller 102 may instruct actuation of each drive motor 710 via a corresponding axle torque command $T_{a\_cmd}$ that specifies a magnitude and direction of axle torque $T_a$ for the drive motor 710 to apply for rotating the respective drive wheel 700 in the forward or backward direction. Based on the inertial measurement received from the inertial measurement unit 106, the controller 102 may provide a corresponding axle torque command $T_{a\_cmd}$ to at least one of the drive motors 710 to instruct the drive motor 710 to apply the corresponding axle torque $T_a$ in order to control tilt to maintain or restore balance of the robot 100.

The sensor(s) 110 of the control system 10 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 110 may be disposed on the robot 100 at various locations such as the torso 200, tail 300, the at least one leg 400, the drive wheel 700, the articulated arm 800, and/or the end effector 900. The sensors 110 are configured to provide corresponding sensor data to the controller 102 for monitoring and controlling operation of the robot 100 within an environment. In some examples, the controller 102 is configured to receive sensor data from sensors physically separated from the robot 100. For instance, the controller 102 may receive sensor data from a proximity sensor disposed on a target object the robot 100 is configured to locate and transport to a new location.

The sensor data from the sensors 110 may allow the controller 102 to evaluate conditions for maneuvering the robot 100, altering a pose P of the robot 100, and/or actuating various actuators 108 for moving/rotating mechanical components such as the counter-balance body 300, the at least one leg 400, the drive wheel 700 rotatably coupled to the at least one leg 400, the articulated arm 800, and the end effector 900. In some examples, the sensor data includes rotational positions of the back joint bk, 350, the hip joint(s) 412, and/or the articulated arm joints $J_0$ 850, $J_1$ 860, $J_2$ 870 used to indicate a state of at least one of the counter-balance body 300, the at least one leg 400, the articulated arm 800, or the end effector 900. In some examples, the control system 10 employs one or more force sensors to measure load on the actuators that move the counter-balance body 300, the at least one leg 400, the drive wheel 700 rotatably coupled to the at least one leg 400, the articulated arm 800, or the end effector 900. The sensors 110 may further include position sensors to sense states of extension, retraction, and/or rotation of the counter-balance body 300, the at least one leg 400, the drive wheel 700 rotatably coupled to the at least one leg 400, the articulated arm 800, or the end effector 900.

Other sensors 110 may capture sensor data corresponding to the terrain of the environment and/or nearby objects/obstacles to assist with environment recognition and navigation. For instance, some sensors 110 may include RADAR (e.g., for long-range object detection, distance determination, and/or speed determination) LIDAR (e.g., for short-range object detection, distance determination, and/or speed determination), VICON® (e.g., for motion capture), one or more imaging (e.g., stereoscopic cameras for 3D vision), perception sensors, a global positioning system (GPS) device, and/or other sensors for capturing information of the environment in which the robot 100 is operating.

In some implementations, the control system 10 includes one or more power sources 112 configured to power various components of the robot 100. The power sources 112 employed by the robot 100 may include, without limitation, a hydraulic system, an electrical system, energy storage device(s) (e.g. batteries), and/or pneumatic devices. For instance, one or more energy storage devices may provide power to various components (e.g., actuators 108) of the robot 100. The drive motors 710 may include electric motors that receive power from one or more energy storage devices. In some examples, the counter-balance body 300 defines a compartment for storing and retaining energy storage devices. The energy storage devices may be chargeable via wired connections or wireless (e.g. induction) connections to an external power source. Energy storage devices could also be charged using solar energy (e.g., generated via solar panels disposed on the robot 100). In some examples, the energy storage devices are removable so that depleted energy storage devices can be replaced with fully-charged energy storage devices. Gasoline engines could also be employed. A hydraulic system may employ hydraulic motors and cylinders for transmitting pressurized fluid for operating various components of the robot 100.

Figure 2:
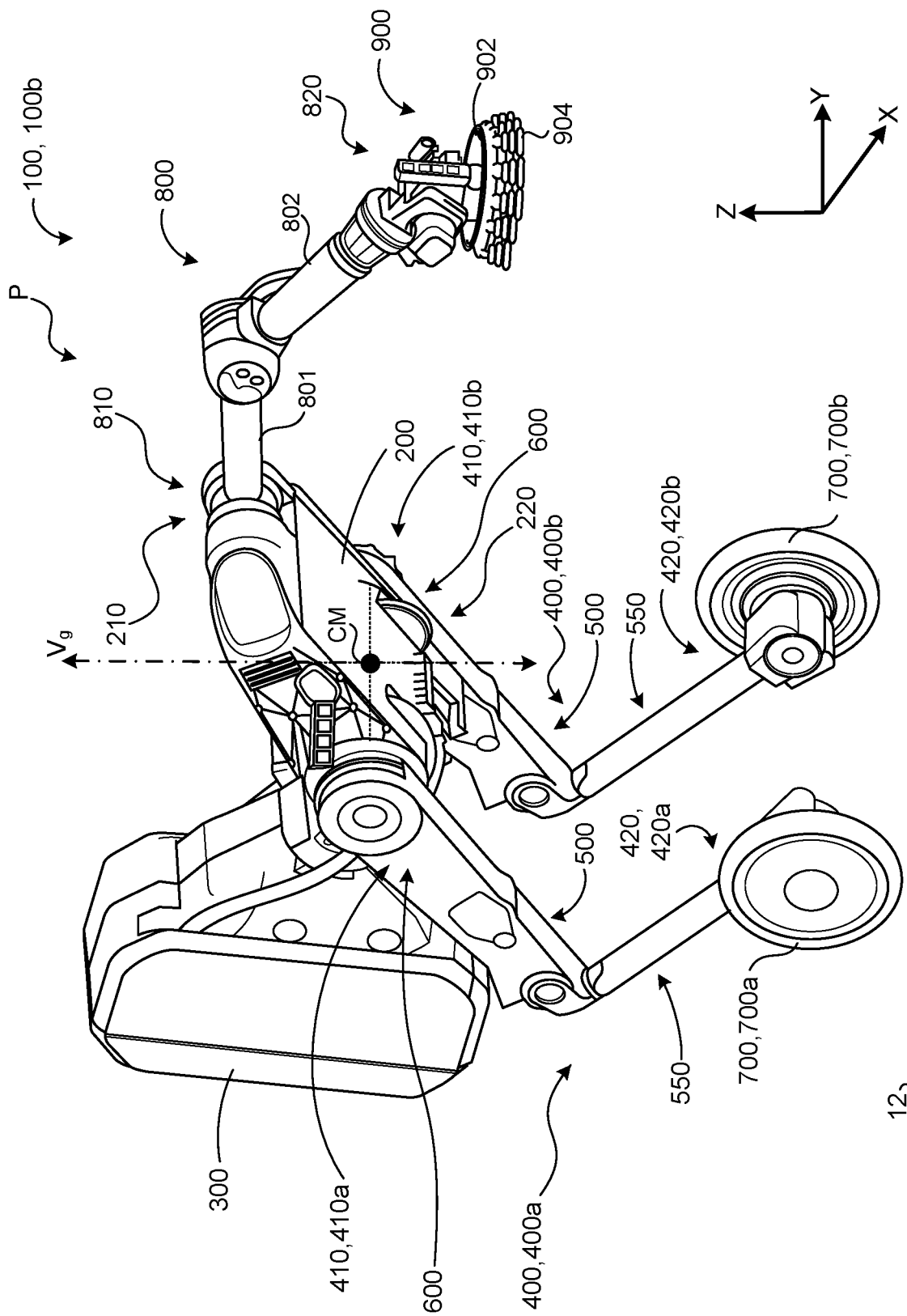
FIG. 2 is a schematic view of an example robot.

Referring to FIG. 2, in some implementations, a robot 100b includes an inverted pendulum body (IPB) 200, a counter-balance body 300 disposed on the IPB 200, at least one leg 400 having a first end 410 and a second end 420, and a drive wheel 700 rotatably coupled to the second end 420 of the at least one leg 400. In view of the substantial similarity in structure and function of the components associated with the robot 100a with respect to the robot 100b, like reference numerals are used herein after and in the drawings to identify like components.

As with the robot 100a of FIGS. 1A-1E, the robot 100b has a vertical gravitational axis $V_g$, which is perpendicular to a ground surface 12 along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 200 includes the first end portion 210 and the second end portion 220. While the counter-balance body 300 of the robot 100a of FIGS. 1A-1E is disposed on the first end portion 210 of the IPB 200, the counter-balance body 300 of the robot 100b of FIG. 2 is disposed on the second end portion 220 of the IPB 200. In a similar fashion to the counter-balance body 300 of the robot 100a, the counter-balance body 300 of the robot 100b may pitch around a lateral axis (y-axis) that extends perpendicular to the gravitational vertical axis $V_g$ and a fore-aft axis (x-axis) of the robot 100 for altering a pose P of the robot 100b. For instance, the counter-balance body 300 may pitch relative to the gravitational vertical axis $V_g$ in a first direction for shifting the CM of the robot 100b towards the ground surface 12 and in an opposite second direction for shifting the CM of the robot 100b away from the ground surface 12. Accordingly, rotational movement by the counter-balance body 300 relative to the IPB 200 may be used for balancing and maintaining the robot 100b in an upright position.

The at least one leg 400 of the robot 100b may include the variable length right and left legs 400a, 400b each including a corresponding first end 410 rotatably/prismatically coupled to the second end portion 220 of the IPB 200 and a corresponding second end 420 rotatably coupled to a corresponding right drive wheel 700a, 700b. In a similar fashion to the robot 100a, the robot 100b may employ various actuators for altering the lengths of the legs 400a, 400b. For instance, a length/height of at least one of the legs 400a, 400b may be altered to lean the drive wheels 700a, 700b into a turning direction to assist with a turning maneuver.

With continued reference to FIG. 2, the robot 100b further includes an articulated arm 800 disposed on the IPB 200 and configured to move relative to the IPB 200. The articulated arm 800 may have five-degrees of freedom. By contrast to the robot 100a of FIGS. 1A-1E having the articulated arm 800 disposed on the second end portion 220 of the IPB 200, the robot 100b includes the articulated arm 800 disposed on the first end portion 210 of the IPB 200. The articulated arm 800 extends between a proximal first end 810 rotatably coupled to the IPB 200 and a distal second end 820. In the example shown, the articulated arm 800 includes two portions 801, 802 rotatable relative to one another and also the IPB 200; however, the articulated arm 800 may include more or less portions without departing from the scope of the present disclosure. An end effector 900 may be coupled to the distal second end 820 of the articulated arm 800 and may include one or more actuators 902 for gripping/grasping objects. The end effector 900 may optionally include one or more suction cups 904 configured to provide a vacuum seal between the end effector 900 and a target object to allow the articulated arm 800 to carry the target object.

The articulated arm 800 may pitch about the lateral axis (y-axis) relative to the IPB 200. For instance, the articulated arm may rotate about the lateral axis (y-axis) relative to the IPB 200 in the direction of gravity to lower the CM of the robot 100 while executing turning maneuvers. The counter-balance body 300 may also simultaneously rotate about the lateral axis (y-axis) relative to the IPB 200 in the direction of gravity to assist in lowering the CM of the robot 100b. Here, the articulated arm 800 and the counter-balance body 300 may cancel out any shifting in the CM of the robot 100b in the forward or rearward direction along the fore-aft axis (x-axis), while still effectuating the CM of the robot 100b shift downward closer to the ground surface 12.

Figure 3:
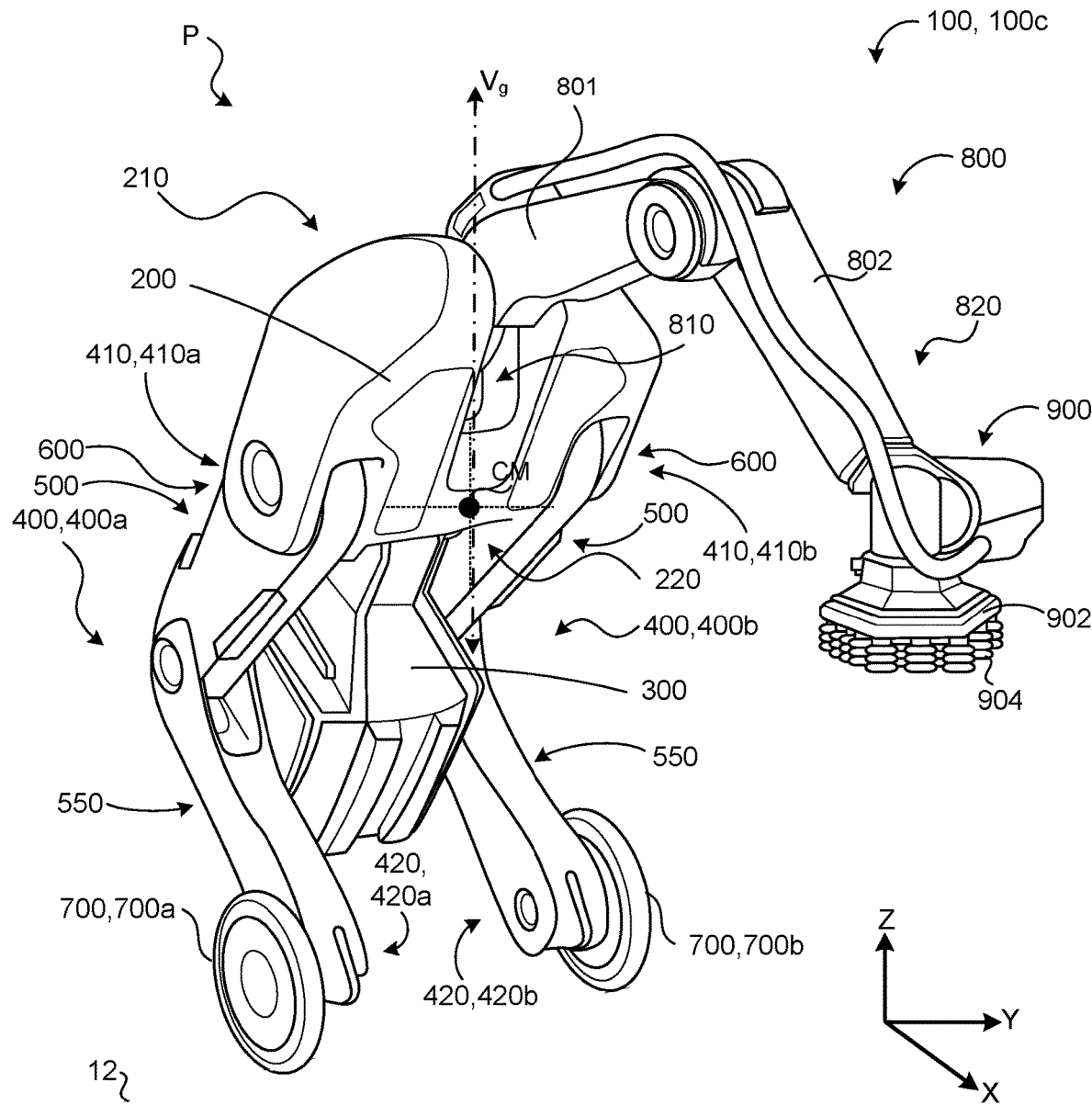
FIG. 3 is a schematic view of an example robot.

Referring to FIG. 3, in some implementations, a robot 100c includes an inverted pendulum body (IPB) 200, a counter-balance body 300 disposed on the IPB 200, at least one leg 400 having a first end 410 and a second end 420, and a drive wheel 700 rotatably coupled to the second end 420 of the at least one leg 400. In view of the substantial similarity in structure and function of the components associated with the robot 100a with respect to the robot 100b, like reference numerals are used herein after and in the drawings to identify like components.

As with the robot 100a of FIGS. 1A-1E, the robot 100c has a vertical gravitational axis $V_g$, which is perpendicular to a ground surface 12 along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100c. The attitude of the robot 100 can be defined by an orientation or an angular position of an object in space.

The IPB 200 includes the first end portion 210 and the second end portion 220. While the counter-balance body 300 of the robot 100a of FIGS. 1A-1E is disposed on the first end portion 210 of the IPB 200, the counter-balance body 300 of the robot 100c of FIG. 3 is disposed on the second end portion 220 of the IPB 200. In a similar fashion to the counter-balance body 300 of the robot 100a, the counter-balance body 300 of the robot 100b may pitch around a lateral axis (y-axis) that extends perpendicular to the gravitational vertical axis $V_g$ and a fore-aft axis (x-axis) of the robot 100c for altering a pose P of the robot 100c. For instance, the counter-balance body 300 may pitch relative to the gravitational vertical axis $V_g$ in a first direction for shifting the CM of the robot 100b towards the ground surface 12 and in an opposite second direction for shifting the CM of the robot 100c away from the ground surface 12. Accordingly, rotational movement by the counter-balance body 300 relative to the IPB 200 may be used for balancing and maintaining the robot 100c in an upright position.

The at least one leg 400 of the robot 100c may include the variable length right and left legs 400a, 400b each including a corresponding first end 410 rotatably coupled to the second end portion 220 of the IPB 200 and a corresponding second end 420 rotatably coupled to a corresponding right drive wheel 700a, 700b. In a similar fashion to the robot 100a, the robot 100c may employ various actuators for altering the lengths of the legs 400a, 400b. For instance, a length/height of at least one of the legs 400a, 400b may be altered to lean the drive wheels 700a, 700b into a turning direction to assist with a turning maneuver.

With continued reference to FIG. 3, the robot 100c further includes an articulated arm 800 disposed on the IPB 200 and configured to move relative to the IPB 200. The articulated arm 800 may have five-degrees of freedom. By contrast to the robot 100c of FIGS. 1A-1E having the articulated arm 800 disposed on the second end portion 220 of the IPB 200, the robot 100b includes the articulated arm 800 disposed on the first end portion 210 of the IPB 200. The articulated arm 800 extends between a proximal first end 810 rotatably coupled to the IPB 200 and a distal second end 820. In the example shown, the articulated arm 800 includes two portion 801, 802 rotatable relative to one another and also the IPB 200; however, the articulated arm 800 may include more or less portions without departing from the scope of the present disclosure. An end effector 900 may be coupled to the distal second end 820 of the articulated arm 800 and may include one or more actuators 902 for gripping/grasping objects. The end effector 900 may optionally include one or more suction cups 904 configured to provide a vacuum seal between the end effector 900 and a target object to allow the articulated arm 800 to carry the target object.

The articulated arm 800 may pitch about the lateral axis (y-axis) relative to the IPB 200. For instance, the articulated arm may rotate about the lateral axis (y-axis) relative to the IPB 200 in the direction of gravity to lower the CM of the robot 100c while executing turning maneuvers. The counter-balance body 300 may also simultaneously rotate about the lateral axis (y-axis) relative to the IPB 200 in the direction of gravity to assist in lowering the CM of the robot 100c. Here, the articulated arm 800 and the counter-balance body 300 may cancel out any shifting in the CM of the robot 100c in the forward or rearward direction along the fore-aft axis (x-axis), while still effectuating the CM of the robot 100b shift downward closer to the ground surface 12.

Figure 4:
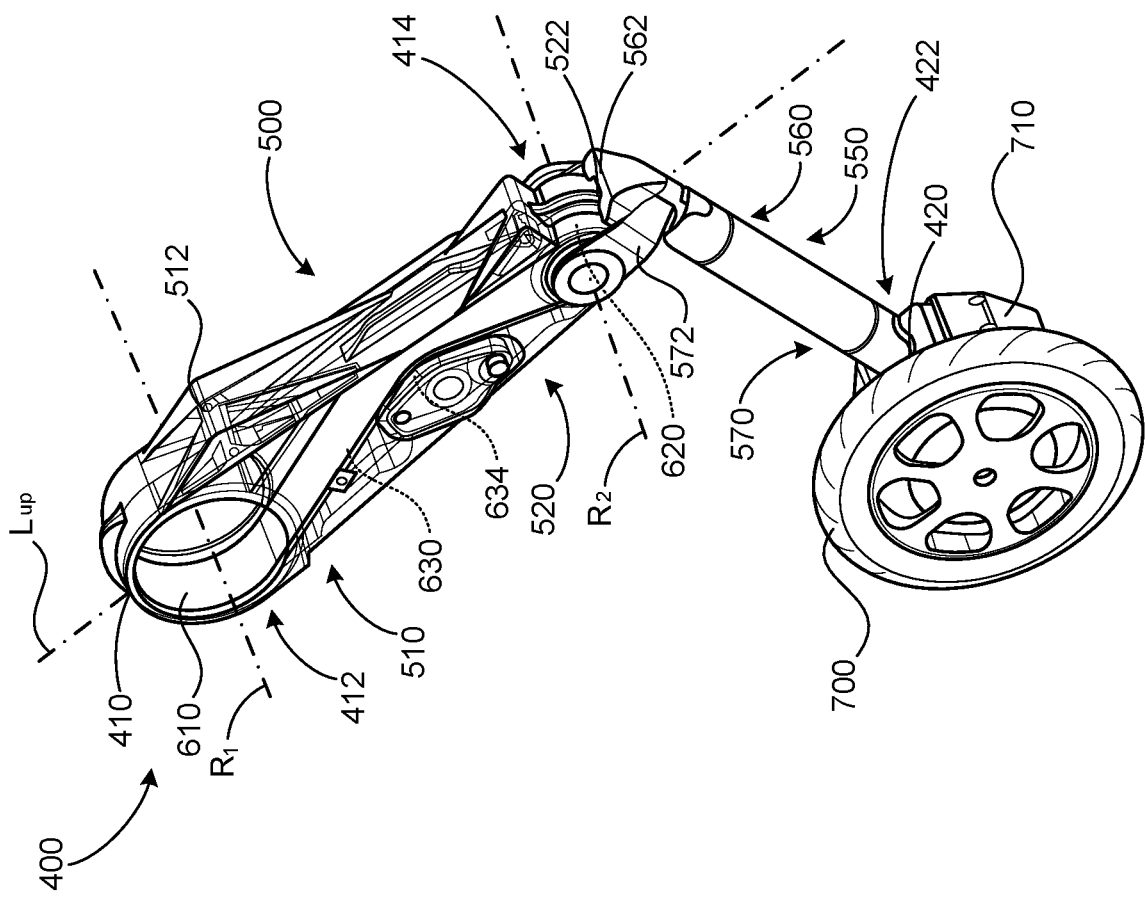
FIG. 4 is a schematic view of an example robotic leg including a first leg portion (upper portion) and a second leg portion (lower portion).
Figure 5:
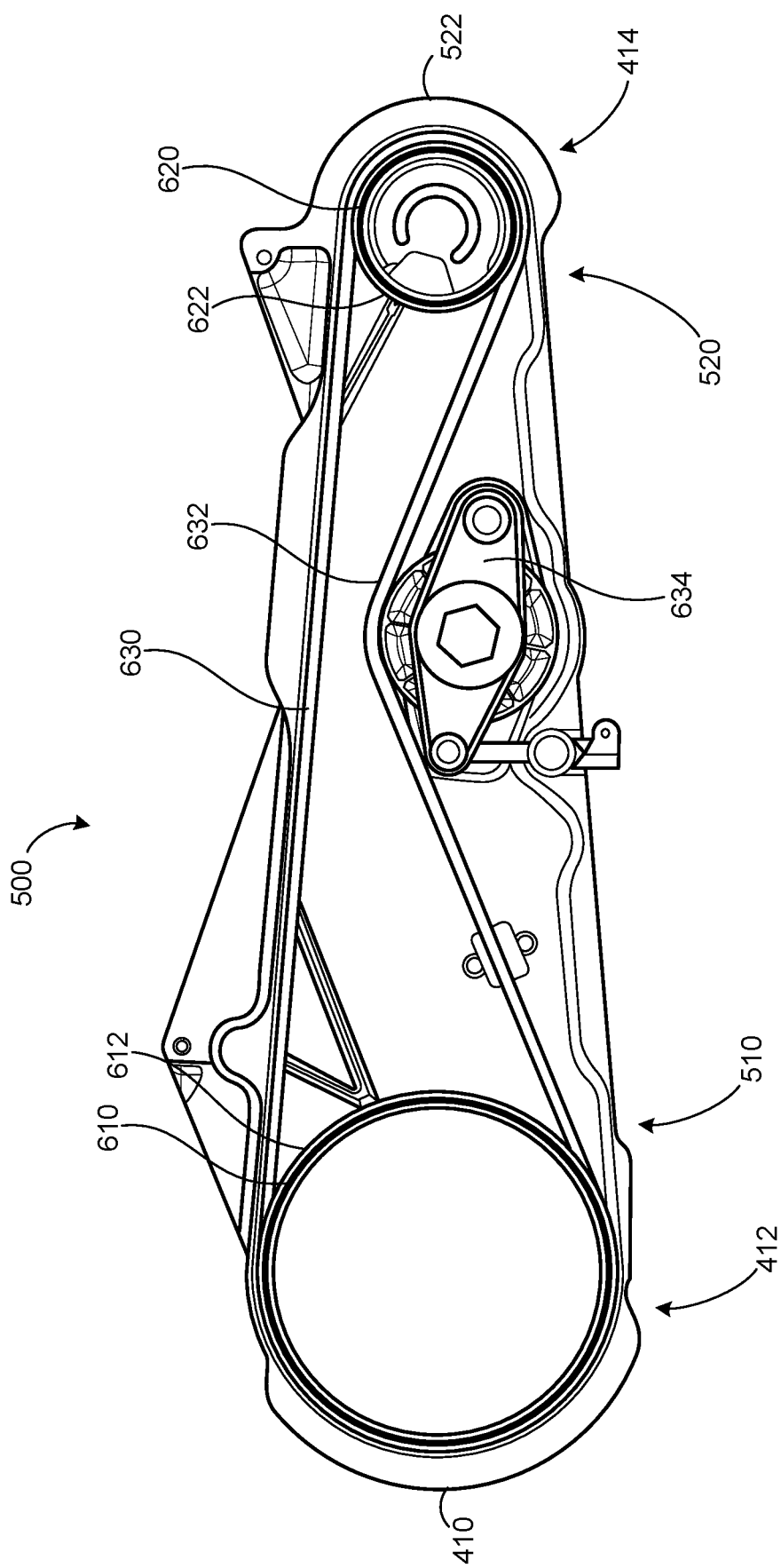
FIG. 5 is a schematic view of the first leg portion (upper portion) of the example robotic leg of FIG. 4.

Referring to FIGS. 4 and 5, the leg 400 includes the upper portion 500 and the lower portion 550. The upper portion 500 of the leg 400 may be interchangeably referred to as a "first leg portion" and the lower portion 550 of the leg may be interchangeably referred to as a "second leg portion". The upper portion 500 has a first end portion 510 and a second end portion 520. The first end portion 510 includes the first end 410 of the leg 400 (e.g., the proximal end of the leg 400) proximate to the hip joint 412, and the second end portion 520 includes a second end 522 proximate to the knee joint 414 of the leg 400. For instance, the upper portion 500 may define a length between the first end 410 associated with the first end portion 510 and the second end 522 associated with the second end portion 520. In some examples, a point of delineation separating the first and second end portions 510, 520 of the upper portion 500 is at a midpoint between the first end 410 and the second end 522, so that the first end portion 510 encompasses 50-percent of the length of the upper portion 500 and the second end portion 520 encompasses the remaining 50-percent of the length of the upper portion 500. In other examples, the point of delineation separating the first and second end portions 510, 520 of the upper portion 500 is closer to one of the first end 410 or the second end 522 so that one of the first end portion 510 or the second end portion 520 extends along a larger portion of the length of the upper portion 500 than the other one of the first end portion 510 or the second end portion 520. For instance, the first end portion 510 extending from the first end 410 may encompass 90-, 80-, 70-, 60-, 40-, 30-, 20-, 10-percent of the length of the upper portion 500 while the second end portion 520 extending from the second end 522 may encompass the remaining 10-, 20-, 30-, 60-, 70-, 80-, 90-percent of the length of the upper portion 500.

Referring to FIG. 4, the lower portion 550 has a first end portion 560 and a second end portion 570. As used herein, the first end portion 560 and the second end portion 570 may form a single, monolithic lower portion 550. The first end portion 560 includes a first end 562 proximate to the knee joint 414 of the leg 400, and the second end portion 570 includes the second end 420 (e.g., the distal end of the leg 400) proximate to the ankle joint 422 of the leg 400. For instance, the lower portion 550 may define a length between the first end 562 associated with the first end portion 560 and the second end 420 associated with the second end portion 570. In some examples, the length of the lower portion 550 is substantially equal to the length of the upper portion 500. A point of delineation separating the first and second end portions 560, 570 is at a midpoint between the first end 562 and the second end 420, so that the first end portion 560 encompasses 50-percent of the length of the lower portion 550 and the second end portion 570 encompasses the remaining 50-percent of the length of the lower portion 550. In other examples, the point of delineation separating the first and second end portions 560, 570 of the lower portion 550 is closer to one of the first end 562 or the second end 420 so that one of the first end portion 560 or the second end portion 570 extends along a larger portion of the length of the lower portion 550 than the other one of the first end portion 560 or the second end portion 570. For instance, the first end portion 560 extending from the first end 562 may encompass 90-, 80-, 70-, 60-, 40-, 30-, 20-, 10-percent of the length of the lower portion 550 while the second end portion 570 extending from the second end 420 may encompass the remaining 10-, 20-, 30-, 60-, 70-, 80-, 90-percent of the length of the lower portion 550.

First Robotic Leg Assembly

With continued reference to FIGS. 4 and 5, a first robotic leg assembly includes a hip member 430 (FIG. 6B) and the leg 400 having a first pulley 610 fixedly attached to the hip member 430 and defining a first axis of rotation $R_1$. The first axis of rotation $R_1$ may be coaxial with or parallel to an axis of rotation of the hip joint 412. The hip member 430 may simply be referred to as "hip", and in some implementations, the hip member 430 is associated with the second end portion 220 of the IPB 200 (FIGS. 1A-3). Here, the first end portion 510 of the upper portion 500 is rotatably coupled to the hip and configured to rotate about the first axis of rotation $R_1$. Accordingly, an axis of rotation of the first end portion 510 of the upper portion 500 may be concentric with the first axis of rotation $R_1$ defined by the first pulley 610. For example, the upper portion 500 may define a longitudinal axis $L_{UP}$ and the first axis of rotation $R_1$ may be perpendicular to the longitudinal axis $L_{UP}$. Alternatively, the first axis of rotation $R_1$ may have any suitable configuration and orientation relative to the upper portion 500 and the hip joint 412. The leg 400 includes a second pulley 620 rotatably coupled to the second end portion 520 of the upper portion 500 and fixedly attached to the first end portion 560 of the lower leg portion 550. The second pulley 620 defines a second axis of rotation $R_2$ which may be coaxial with or parallel to an axis of rotation of the knee joint 414. Similarly, an axis of rotation of the first end portion 560 of the lower portion 550 may be concentric with the second axis of rotation $R_2$ of the second pulley 620. For example, the second axis of rotation $R_2$ may be perpendicular to the longitudinal axis $L_{UP}$ defined by the upper portion 500. Alternatively, the second axis of rotation $R_2$ may have any suitable configuration and orientation relative to the upper portion 500 and the knee joint 414. In some implementations, the first axis of rotation $R_1$ is parallel to the second axis of rotation $R_2$. In other examples, the first axis of rotation $R_1$ and the second axis of rotation $R_2$ are each perpendicular to the longitudinal axis $L_{UP}$ of the upper portion 500 and convergent to one another.

The leg 400 includes a timing belt 630 trained about the first pulley 610 and the second pulley 620 for synchronizing rotation of the upper portion 500 about the first axis of rotation $R_1$ and rotation of the second pulley 620 about the second axis of rotation $R_2$. The timing belt 630 may include teeth 632 (FIG. 5) on an inner surface that engage with corresponding teeth 612, 622 (FIGS. 5 and 6A) on outer circumferential surfaces of the first pulley 610 and the second pulley 620, respectively. In some implementations, the first pulley 610 may have twice as many teeth 612 as the second pulley 620. For example, the first pulley 610 may have sixty (60) teeth and the second pulley 620 may have thirty (30) teeth. The timing belt 630 may be formed of any suitable material, such as, for example, rubber, rubber with high-tensile fibers, polyurethane, or neoprene. The leg 400 may optionally include a belt tensioner 634 disposed on the upper portion 500 and in contact with the timing belt 630. The belt tensioner 634 may be configured to adjustably set a tension of the timing belt 630. For example, the belt tensioner 634 may selectively increase or decrease the tension of the timing belt 630. For example, the belt tensioner 634 may be configured to set the tension of the timing belt 630 to a predetermined tension.

Figure 6A:
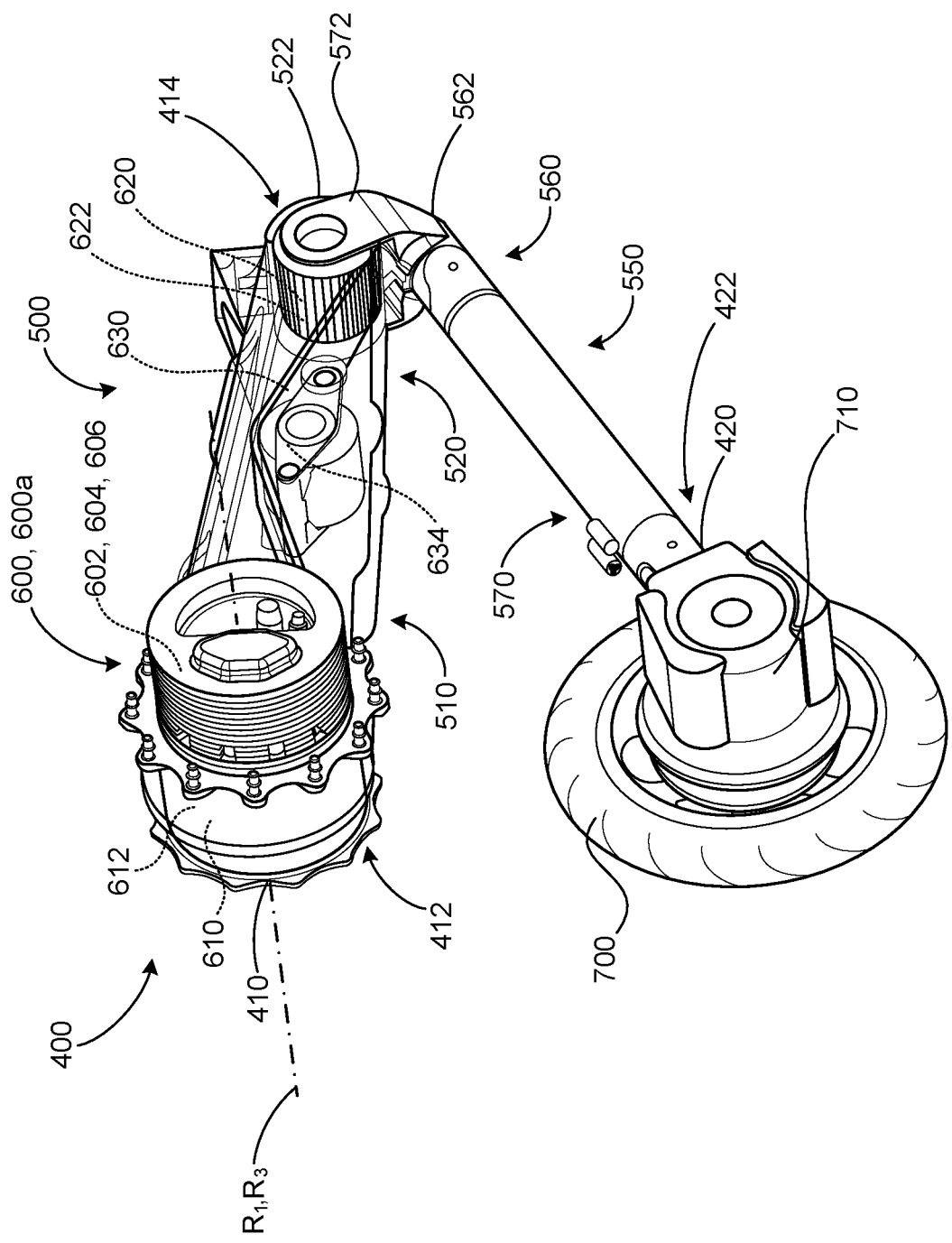
FIG. 6A is a schematic view of a rotary motor arranged to drive rotation of a first pulley fixedly attached to the first leg portion (upper portion) of the example robotic leg of FIG. 4.
Figure 6B:
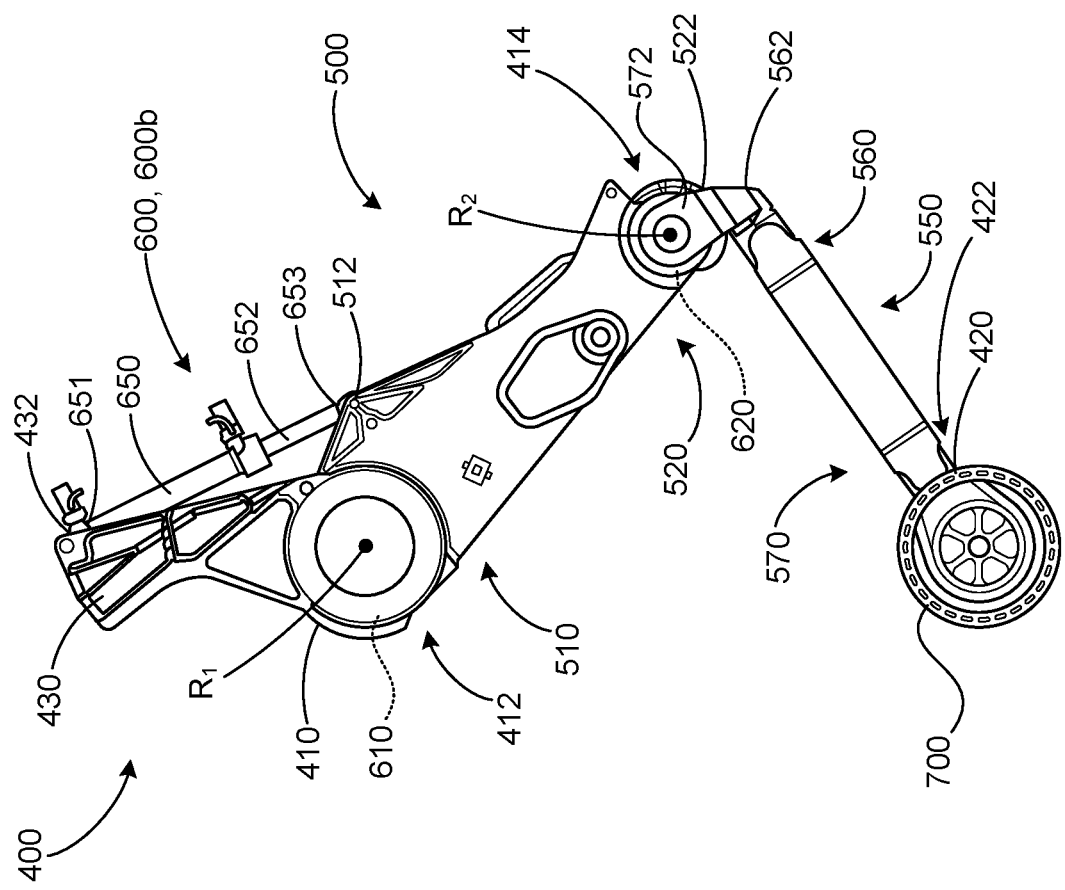
FIG. 6B is a schematic view of a linear actuator arranged to drive rotation of a first pulley fixedly attached to the first leg portion (upper portion) of the example robotic leg of FIG. 4.

Referring to FIGS. 6A and 6B, the leg 400 may include an actuating device 600, 600a-b disposed at or near the hip joint 412 that is configured to drive rotation of the upper portion 500 of the leg 400 about the hip joint 412 to cause the upper portion 500 to move/pitch around the lateral axis (y-axis) relative to the IPB 200 (FIGS. 1-3). Referring to FIG. 6A, in some implementations, the actuating device 600 includes a rotary electric motor 600a arranged to drive rotation of the upper portion 500 about the first axis of rotation $R_1$. The rotary electric motor 600a may include an associated transmission (e.g., gearbox) 602 and may be mounted/attached to an exterior of the first end portion 510 of the upper portion 500. In the example shown, the electric motor 600a mounts proximate to the first pulley 610. In some examples, the electric motor 600a defines a rotary axis $R_3$ which is arranged coincident to the first axis of rotation $R_1$. For example, the electric motor 600a may include a rotor 604 arranged to rotate about the rotary axis $R_3$ and a stator 606 arranged concentrically around the rotor 604. The rotor 604 may be attached to the first end portion 510 of the upper portion 500 and the stator 606 may be configured for attachment to the robot 100, e.g., at the hip member 430 (IPB 200) of the robot 100 or at the first pulley 610. That is, the rotor 604 may rotate relative to the IPB 200 of the robot 100 and the stator 606 may be fixed relative to the IPB 200 of the robot 100. Optionally, the stator 606 may be configured for attachment to the first end portion 510 of the upper portion 500 of the leg 400. In some implementations, the electric motor 600a forms the hip joint 412 by rotatably coupling the first end 410 of the leg 400 to the second end portion 220 of the IPB 200 to allow at least a portion (e.g., the upper portion 500) of the leg 400 to move/pitch around the lateral axis (y-axis) relative to the IPB 200.

Referring to FIG. 6B, in other implementations, the actuating device 600 includes a linear actuator 600b disposed at or near the hip joint 412 that is configured to drive rotation of the upper portion 500 of the leg 400 about the hip joint 412 to cause the upper portion 500 to move/pitch around the lateral axis (y-axis) relative to the IPB 200 (FIGS. 1-3). Specifically, the rotatable coupling between the first end portion 510 of the upper portion 500 of the leg 400 and the first pulley 610 may rotatably couple the first end portion 510 of the upper portion 500 to the hip member 430 and the linear actuator 600b may be disposed on the hip member 430. The linear actuator 600b may include a translatable actuator arm 652 pivotally coupled to the upper portion 500 (e.g., first leg portion) of the leg 400. Thus, in the example shown, the linear actuator 600b includes a first end 651 pivotally coupled to the hip member 430 at a first attachment point 432 and a second end 653 pivotally coupled to the upper portion 500 of the leg 400 at a second attachment point 512. In some examples, the translatable actuator arm 652 is slidably engaged to a cylinder 650, that may define the first end 651 of the linear actuator 600b pivotally coupled to the hip member 430 at the first attachment point 432. For example, the cylinder 650 may define a housing and the translatable actuator arm 652 may linearly translate/slide within the housing of the cylinder 650 such that a distal end of the translatable actuator arm 652 (i.e., the second end 653 of the linear actuator 600b) pivotally coupled to the upper portion 500 of the leg 400 moves between a retracted position and an extended position. The linear actuator 600b may hydraulically, electrically, or pneumatically actuate the translatable actuator arm 652. The linear actuator 600b may use other means of actuation as well. In some implementations, the hip member 430 is associated with the second end portion 220 of the IPB 200. In some implementations, actuation of the translatable actuator arm 652 of the linear actuator 600b causes rotation of the upper portion 500 about the first axis of rotation $R_1$, thereby enabling the upper portion 500 to move/pitch around the lateral axis (y-axis) relative to the first pulley 610 and the hip member 430 (and the IPB 200).

The lower portion 550 of the leg 400 optionally includes a coupler 572 attached to the first end portion 560 at or near the first end 562. The coupler 572 may pivotally couple the lower portion 550 of the leg 400 to the upper portion 500 of the leg 400 to form the knee joint 414. Specifically, the coupler 572 may enable the lower portion 550 to rotate relative to the upper portion 500 by fixedly attaching the first end portion 560 of the lower portion 550 to the second pulley 620, whereby the second pulley 620 is rotatably coupled to the second end portion 520 of the upper portion 500.

FIGS. 7A-7D show schematic views of the variable length leg 400 prismatically moving between a fully extended position, as shown in FIG. 7A, and a fully retracted position, as shown in FIG. 7D. In the example shown, the actuating device 600 prismatically retracts the length of the leg 400 by rotating the corresponding upper portion 500 relative to the IPB 200 in a counterclockwise direction to cause the corresponding lower portion 550 to rotate about the knee joint 414 relative to the upper portion 500 in the clockwise direction (relative to the view of FIGS. 7A-7D). Here, the timing belt 630 (FIG. 5) trained about the first pulley 610 and the second pulley 620 operates in a passive manner to synchronize rotation of the upper portion 500 about the first axis of rotation $R_1$ and rotation of the second pulley 620 about the second axis of rotation $R_2$. On the other hand (not shown), the actuating device 600 prismatically expands the length of the leg 400 by rotating the corresponding upper portion 500 relative to the IPB 200 in the clockwise direction to cause the corresponding lower portion 550 to rotate about the knee joint 414 relative to the upper portion 500 in the counterclockwise direction (relative to the view of FIGS. 7A-7D). The timing belt 630 may include a continuous loop extending along the upper portion 500 of each leg 400 or may include terminal ends each connected to a respective one of the first pulley 610 and the second pulley 620. While the schematic views of FIGS. 7A-7D show the linear actuator 600b of FIG. 6B controlling actuation of the leg 400, the rotary electric motor 600a of FIG. 6A may control actuation of the leg 400 to prismatically retract/expand without departing from the scope of the present disclosure.

Relative to the views of FIGS. 7A-7D, to move from the fully extended position (FIG. 7A), in which the translatable actuator arm 652 is fully extended, to the fully retracted position (FIG. 7D), in which the translatable actuator arm 652 is fully retracted, the upper portion 500 of the leg 400 rotates about the hip joint 412 relative to the IPB 200 in a counterclockwise direction while the lower portion 550 of the leg 400 rotates about the knee joint 414 relative to the upper portion 500 in the clockwise direction. For instance, to move from the fully extended position (FIG. 7A) to a first intermediate position, as shown in FIG. 7B, the linear actuator 600b may retract the translatable actuator arm 652 to cause the upper portion 500 to rotate in the counterclockwise direction and the lower portion 550 to rotate about the knee joint 414 relative to the upper portion 500 in the clockwise direction. Here, the rotation by the upper portion 500 about the hip joint 412 (e.g., the first axis of rotation $R_1$) in the counterclockwise direction causes the second pulley 620 to rotate about the second axis of rotation $R_2$ in the clockwise direction, thereby causing the lower portion 550 of the leg to rotate about the knee joint 414 relative to the upper portion 500 in the clockwise direction. By fixedly attaching the first pulley 610 to the hip member 430 (FIG. 6B) and rotatably coupling the first end portion 510 of the upper portion 500 of the leg 400 to the first pulley 610, the first pulley 610 may remain substantially static or fixed relative to the timing belt 630 when the upper portion 500 rotates about the hip joint 412. Conversely, by rotatably coupling the second pulley 620 to the second end portion 520 of the upper portion 500 of the leg 400 and fixedly attaching the first end portion 560 of the lower portion 550 of the leg 400 to the second pulley 620, the second pulley 620 may rotate relative to the timing belt 630 in a direction opposite to a direction the upper portion 500 rotates about the hip joint 412. For example, the teeth 632 on the timing belt 630 may be engaged with the same corresponding teeth 612 on the first pulley 610 as the upper portion 500 rotates about the hip joint 412, whereas, the teeth 632 on the timing belt 630 may engage with different corresponding teeth 622 on the second pulley 620 as the upper portion 500 rotates about the hip joint 412, thereby causing the second pulley 620 to rotate relative to the timing belt 630 to cause the rotation of the lower portion 550 about the knee joint 414.

Similarly, to move from the first intermediate position (FIG. 7B) to a second intermediate position, as shown in FIG. 7C, the linear actuator 600b may further retract the translatable actuator arm 652 to cause the upper portion 500 to rotate further about the hip joint 412 relative to the IPB 200 in the counterclockwise direction and the lower portion 550 to rotate further about the knee joint 414 relative to the upper portion 500 in the clockwise direction. Lastly, to move from the second intermediate position (FIG. 7C) to the fully retracted position (FIG. 7D), the linear actuator 600b may further retract the translatable actuator arm 652 to cause the upper portion to rotate further about the hip joint 412 relative to the IPB 200 in the counterclockwise direction and the lower portion 550 to rotate further about the knee joint 414 relative to the upper portion 500 in the clockwise direction. In configurations that use the rotary electric motor 600a of FIG. 6A to control actuation of the leg 400, the electric motor 600 (i.e., the rotor 604) may rotate in a first direction to retract the length of the leg 400 and rotate in a second opposite direction to expand the length of the leg 400.

In some examples, the first pulley 610 and the second pulley 620 are sized to cause a 2:1 ratio of the rotation of the lower portion 550 about the second axis of rotation $R_2$ to the rotation of the upper portion 500 about the first axis of rotation $R_1$. In this example, the lower portion 550 may rotate about the knee joint 414 relative to the upper portion 500 at twice the angle of the rotation of the upper portion 500 about the hip joint 412, thereby causing the second end 420 of the leg 400 to move on a straight line equivalent to a linear rail. For instance, a line extending through the first axis of rotation $R_1$ and an axis of rotation of the drive wheel 700 disposed at the second end 420 of the leg 400 may be substantially parallel to the vertical gravitational axis $V_g$ in all positions between and including the fully expanded position (FIG. 7A) and the fully retracted position (FIG. 7D). Optionally, instead of a two-link leg (e.g., upper and lower portions 500, 550), the at least one leg 400 may include a single link that prismatically extends/retracts linearly such that the second end 420 of the leg 400 prismatically moves away/toward the IPB 200 along a linear rail. Accordingly, the at least one leg 400 includes a prismatic leg having the first end 410 prismatically coupled to the second end portion 220 of the IPB 200 and configured to provide prismatic extension/retraction via actuation of the actuating device 600 in corresponding first or second directions.

Second Robotic Leg Assembly

Referring back to FIGS. 4 and 5, a second robotic leg assembly includes the leg 400 having the first pulley 610 fixedly attached to the first end portion 510 of the upper portion 500. By contrast to the first robotic leg assembly, the first pulley 610 is rotatably coupled to the hip member 430 (FIG. 6B) and configured to commonly rotate with the upper portion 500 about the first axis of rotation $R_1$. As with the first robotic leg assembly, the second pulley 620 is rotatably coupled to the second end portion 520 of the upper portion 510, while the first end portion 560 of the lower portion 550 of the leg 400 is fixedly attached to the second pulley 620.

The timing belt 630 remains trained about the first pulley 610 and the second pulley 620. However, as the first pulley 610 rotates about the first axis of rotation $R_1$ in the second robotic leg assembly, the rotation of the first pulley 610 drives the timing belt 630, thereby enabling the timing belt 630 to synchronize rotation of the first pulley 610 first axis of rotation $R_1$ and rotation of the second pulley 620 about the second axis of rotation $R_2$.

In some implementations, the second robotic leg assembly includes the coupler 572 pivotally coupling the lower portion 550 of the leg 400 to the upper portion 500 of the leg 400 to form the knee joint 414. In these implementations, the coupler 572 may enable the lower portion 550 to rotate relative to the upper portion 500 by fixedly attaching the first end portion 560 of the lower portion 550 to the second pulley 620, whereby the second pulley 620 is rotatably coupled to the second end portion 520 of the upper portion 500. In some examples, when the second pulley 620 rotates about the second axis of rotation $R_2$, the coupler 572 rotates about the second axis of rotation $R_2$ (or alternatively an axis of rotation parallel to the second axis of rotation $R_2$) in a direction opposite the second pulley 620, e.g., as the second pulley 620 rotates in one of a clockwise or counterclockwise direction, the coupler 572 rotates in the other one of the clockwise direction or the counterclockwise direction.

In some implementations, the actuators 108 of the control system 10 further include the actuating devices 600. For instance, the controller 102 may instruct actuation of the actuating devices 600 to prismatically extend or retract a length of a respective prismatic leg 400 by causing an upper portion 500 of the prismatic leg 400 to rotate about the corresponding hip joint 412 and a lower portion 550 of the prismatic leg 400 to rotate about the corresponding knee joint 414 relative to the corresponding upper portion 500.

Figure 8:
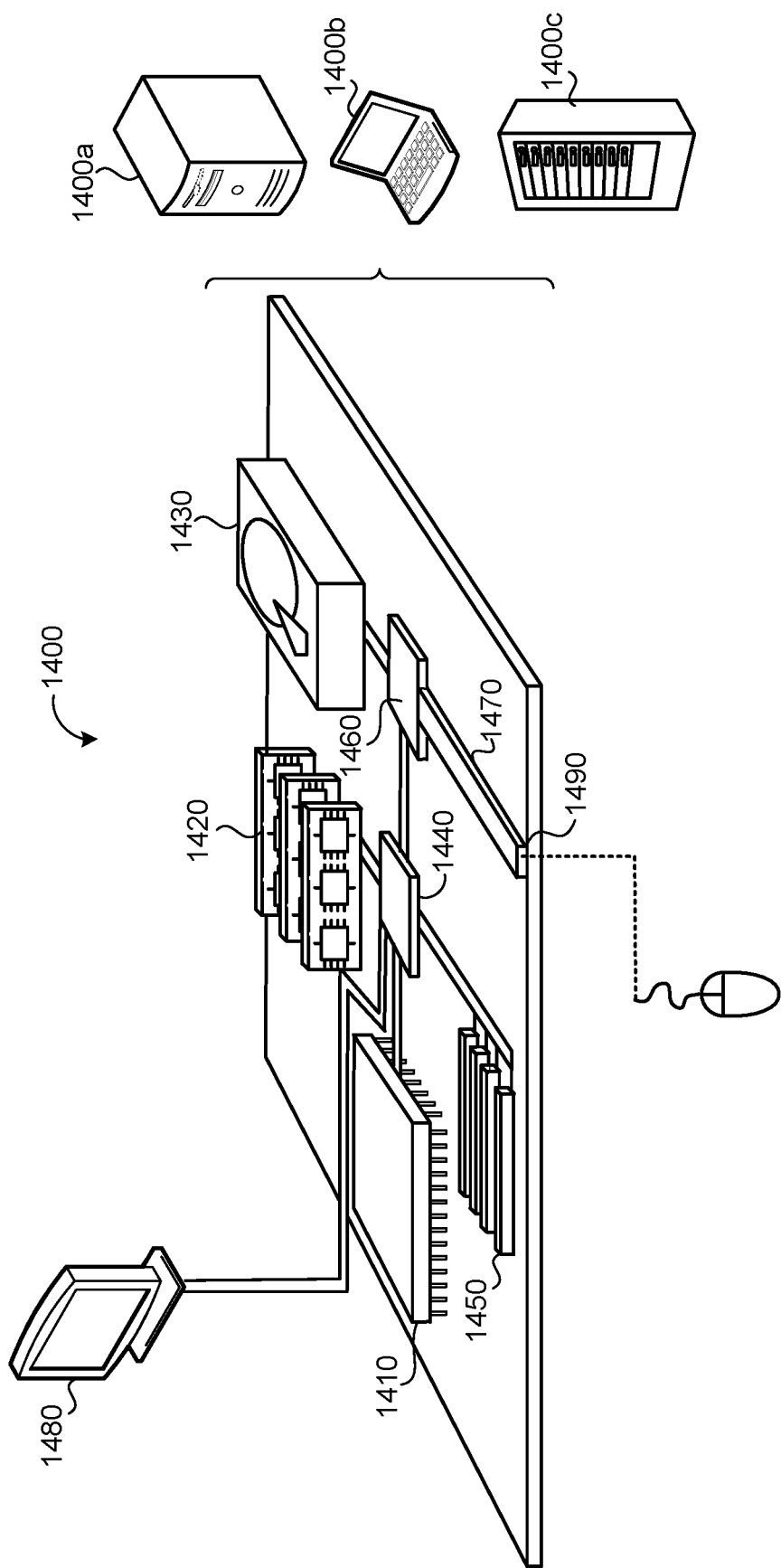
FIG. 8 is a schematic view of an example computing device.

FIG. 8 is schematic view of an example computing device 1400 that may be used to implement the systems and methods described in this document. The computing device 1400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1400 includes a processor 1410 (also referred to as data processing hardware), memory 1420 (also referred to as memory hardware), a storage device 1430, a high-speed interface/controller 1440 connecting to the memory 1420 and high-speed expansion ports 1450, and a low speed interface/controller 1460 connecting to a low speed bus 1470 and a storage device 1430. Each of the components 1410, 1420, 1430, 1440, 1450, and 1460, are interconnected using various busses, and may be mounted on a common motherboard or in other manners as appropriate. The processor 1410 can process instructions for execution within the computing device 1400, including instructions stored in the memory 1420 or on the storage device 1430 to display graphical information for a graphical user interface (GUI) on an external input/output device, such as display 1480 coupled to high speed interface 1440. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1420 stores information non-transitorily within the computing device 1400. The memory 1420 may be a computer-readable medium, a volatile memory unit(s), or non-volatile memory unit(s). The non-transitory memory 1420 may be physical devices used to store programs (e.g., sequences of instructions) or data (e.g., program state information) on a temporary or permanent basis for use by the computing device 1400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1430 is capable of providing mass storage for the computing device 1400. In some implementations, the storage device 1430 is a computer-readable medium. In various different implementations, the storage device 1430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1420, the storage device 1430, or memory on processor 1410.

The high speed controller 1440 manages bandwidth-intensive operations for the computing device 1400, while the low speed controller 1460 manages lower bandwidth-intensive operations. Such allocation of duties is exemplary only. In some implementations, the high-speed controller 1440 is coupled to the memory 1420, the display 1480 (e.g., through a graphics processor or accelerator), and to the high-speed expansion ports 1450, which may accept various expansion cards (not shown). In some implementations, the low-speed controller 1460 is coupled to the storage device 1430 and a low-speed expansion port 1490. The low-speed expansion port 1490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1400a or multiple times in a group of such servers 1400a, as a laptop computer 1400b, or as part of a rack server system 1400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robotic leg assembly comprising:
   a hip;
   a first pulley attached and rotationally fixed relative to the hip and defining a first axis of rotation;
   a first leg portion having a first end portion and a second end portion, the first end portion of the first leg portion rotatably coupled to the hip and configured to rotate about the first axis of rotation;
   a second pulley rotatably coupled to the second end portion of the first leg portion, the second pulley defining a second axis of rotation;
   a second leg portion having a first end portion and a second end portion, the first end portion of the second leg portion attached and rotationally fixed relative to the second pulley; and
   a timing belt trained about the first pulley and the second pulley for synchronizing rotation of the first leg portion about the first axis of rotation and rotation of the second pulley about the second axis of rotation,
   wherein rotation of the first leg portion about the first axis of rotation causes rotation of the second leg portion relative to the first leg portion about the second axis of rotation.

2. The robotic leg assembly of claim 1, wherein the first leg portion defines a longitudinal axis, the first axis of rotation is perpendicular to the longitudinal axis, and the second axis of rotation is perpendicular to the longitudinal axis.

3. The robotic leg assembly of claim 1, wherein the first axis of rotation is parallel to the second axis of rotation.

4. The robotic leg assembly of claim 1, wherein the first pulley and the second pulley are sized to cause a 2:1 ratio of the rotation of the second leg portion about the second axis of rotation to the rotation of the first leg portion about the first axis of rotation.

5. The robotic leg assembly of claim 1, wherein the first pulley has 60 teeth and the second pulley has 30 teeth.

6. The robotic leg assembly of claim 1, wherein:
   the first leg portion defines:
     a proximal end at the first end portion of the first leg portion;
     a distal end at the second end portion of the first leg portion; and
     a first length between the proximal end of the first leg portion and the distal end of the first leg portion,
   the second leg portion defines:
     a proximal end at the first end portion of the second leg portion;
     a distal end at the second end portion of the second leg portion; and
     a second length between the proximal end of the second leg portion and the distal end of the second leg portion, and
   the first length is substantially equal to the second length.

7. The robotic leg assembly of claim 1, further comprising a rotary motor arranged to drive rotation of the first leg portion about the first axis of rotation.

8. The robotic leg assembly of claim 7, wherein the rotary motor defines a rotary axis, and the rotary axis is arranged coincident with the first axis of rotation.

9. The robotic leg assembly of claim 8, wherein the rotary motor comprises:
   a rotor arranged to rotate about the rotary axis, the rotor attached to the first leg portion; and
   a stator arranged concentrically around the rotor.

10. The robotic leg assembly of claim 1, further comprising a linear actuator disposed on the hip and having a translatable actuator arm pivotally coupled to the first leg portion, wherein actuation of the translatable actuator arm of the linear actuator causes rotation of the first leg portion about the first axis of rotation.

* * * * *